United States Patent
Bajaj et al.

(10) Patent No.: US 6,438,266 B1
(45) Date of Patent: Aug. 20, 2002

(54) ENCODING IMAGES OF 3-D OBJECTS WITH IMPROVED RENDERING TIME AND TRANSMISSION PROCESSES

(75) Inventors: Chandrajit Bajaj, Austin, TX (US); Eric D. Petijan, Watchung, NJ (US); Valerio Pascucci; Guozhong Zhuang, both of Austin, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/383,836

(22) Filed: Aug. 26, 1999

Related U.S. Application Data

(60) Provisional application No. 60/098,150, filed on Aug. 27, 1998.

(51) Int. Cl.[7] .............................. G06K 9/36; G06K 9/46
(52) U.S. Cl. ........................................ 382/243; 382/154
(58) Field of Search ................................. 382/154, 232, 382/240, 243; 345/419, 420, 423, 427; 375/240.08, 240.09

(56) References Cited

U.S. PATENT DOCUMENTS

| | | | |
|---|---|---|---|
| 5,949,422 A | * 9/1999 | Mochizuki et al. | 345/420 |
| 6,009,435 A | * 12/1999 | Taubin et al. | 345/420 |
| 6,314,205 B1 | * 11/2001 | Masuda et al. | 382/232 |

* cited by examiner

Primary Examiner—Timothy M. Johnson
(74) Attorney, Agent, or Firm—Charles E. Graves

(57) ABSTRACT

Disclosed is a scheme for creating, manipulating and transmitting images of a 3-D object through networks. A useful layering coupled with vector quantization allows an efficient combination of compressing and encoding of both the topology (connectivity) and geometry (vertex coordinates) of polygon meshes such as triangles. Connectivity information is contained in both generalized triangle strips and exception strips, the latter characterized by triangles for which all three vertices lie in the parent vertex layer. Geometry encoding is achieved with a productive vector quantization scheme which uses correction vectors for which distortion is merged into a following correction vector. Progressive connectivity transmission is achieved by using both intra-layer and inter-layer decomposition and reconstruction. The process encodes connectivity and geometry separately. Encoding of 3-D objects having left-right mirror symmetries using the process is described.

16 Claims, 30 Drawing Sheets

DECOMPOSITION AND ENCODING OF 3D IMAGE

LAYER DECOMPOSITION WITH A SINGLE STARTING POINT

LAYER DECOMPOSITION WHERE FIRST LAYER IS A PATH

LAYER DECOMPOSITION WITH BRANCHING

ISOLATED VERTEX

BRANCHING VERTICES

TRIANGLE STRIP

GENERALIZED TRIANGLE STRIP

EXCEPTIONAL GENERALIZED
TRIANGLE STRIP

CASE 1: A ONE-TRIANGLE BUBBLE

CASE 2: A TWO-TRIANGLE BUBBLE

CASE 3: A HOLE BUBBLE

THE CODING OF A EXCEPTIONAL STRIP

TRIANGLES THAT SPAN MORE THAN ONE
CONTOUR IN SAME VERTEX LAYER

DECOMPOSITION AND
ENCODING OF 3D IMAGE

FLOW CHART FOR
LOCAL INDEXING

| SYMBOL | SYMBOL | SYMBOL | SYMBOL |
|---|---|---|---|
| 0000 | 0101011111 | 1000 | 01010100 |
| 0001 | 010101110 | 1001 | 0100 |
| 0010 | 01011 | 1010 | 00 |
| 0011 | 1111 | 1011 | 0111 |
| 0100 | 010100 | 1100 | 1110 |
| 0101 | 10 | 1101 | 0110 |
| 0110 | 110 | 1110 | 01010101 |
| 0111 | 01010110 | 1111 | 0101011110 |

STATIC HUFFMAN TABLE FOR CONNECTIVITY ENCODING

CONNECTIVITY CODING (HORIZONTAL: NUMBER OF TRIANGLES, VERTICAL: COST IN BITS)

REDUNDANCE WITHIN ADJACENT CORRECTION VECTORS

FREQUENCY: $\gamma$

FREQUENCY: φ

FREQUENCY: θ

A SIMPLE TRIANGLE STRIP

THE SIMPLIFIED TRIANGLE STRIP AFTER THE
FIRST STEP OF INTRA-LAYER DECOMPOSITION

THE SIMPLIFIED TRIANGLE STRIP AFTER
STEP TWO OF INTRA-LAYER DECOMPOSITION

INTRA-LAYER CONNECTIVITY RECONSTRUCTION

TWO ADJACENT TRIANGLE STRIPS

SWEEP EDGES

SIMPLIFIED STRIP AFTER THE INTER-LAYER DECOMPOSITION

GEOMETRY DATA TRANSFER

MERGING THE DISTORTION OF A QUANTIZED
CORRECTION VECTOR INTO THE
FOLLOWING CORRECTION VECTOR

EXAMPLE OF BITSTREAM SYNTAX

| | | |
|---|---|---|
| Length | 32 | uint |
| Bits_nc | 5 | uint |
| Bits_niv | 5 | uint |
| Bits_nb | 5 | uint |
| Bits_nv | 5 | uint |
| Bits_nstrip | 5 | uint |
| Bits_nbub | 5 | uint |
| Bits_ntri | 5 | uint |
| Bits_r | 5 | uint |
| Bits_phi | 5 | uint |
| Bits_theta | 5 | uint |
| resolution | 6 | uint |
| decode_boundingbox() { | | |
|     decode_factor_xyz /* decode_positive() */ | | uint |
|     decode_center_x | 16 | uint |
|     decode_center_y | 16 | uint |
|     decode_center_z | | |
| } | | |
| num_trees    /* decode_positive() */ | | uint |
| for (tree_number=1; tree_number<=num_trees; tree_number++) { | | |
|   do { | | |
|     instance_tree_copy | 4 | uint |
|     if(instance_tree_copy_num) instance_tree_copy_num += instance_tree_copy | | |
|       else instance_tree_copy_num = instance_tree_copy | | |
|   } while(instance_tree_copy = "1111") | | |
|   do { | | |
|     instance_tree_mirror | 4 | uint |
|     if(instance_tree_mirror_num) instance_tree_mirror_num += instance_tree_mirror | | |

FIG. 33-1

| | | |
|---|---|---|
| else instance_tree_mirror_num = instance_tree_mirror | | |
| } while(instance_tree_mirror = "1111") | | |
| for(instance_tree_num = 0; instance_tree_num < instance_tree_copy_num; instance_tree_num++) { | | |
| num_vert_layers /* decode_positive() */ | | uint |
| decode_GDL() | | |
| decode_geometry_data() | | |
| for(layer_number = 2; layer_number <= num_vert_layers; layer_number++) { | | |
| decode_geometry_data() | | |
| decode_connectivity_data() | | |
| do { | | |
| instance_layer_copy | 4 | uint |
| } while(instance_layer_copy = "1111") | | |
| do { | | |
| instance_layer_mirror | 4 | uint |
| } while(instance_layer_mirror = "1111") | | |
| for(instance_layer = 2; instance_layer < instance_layer_copy_num; instance_layer++) | | |
| decode_GDL() | | |
| } | | |
| } | | |
| for(instance_tree_num = 0; instance_tree_num < instance_tree_mirror_num; instance_tree_num++) { | | |
| num_vert_layers /* decode_positive() */ | | uint |
| decode_geometry_data() | | |
| decode_GDL() | | |
| for(layer_number = 2; layer_number <= num_vert_layers; layer_number++) { | | |
| decode_geometry_data() | | |

FIG. 33-2

| | | |
|---|---|---|
| decode_connectivity_data() | | |
| do { | | |
| instance_layer_copy | 4 | uint |
| } while(instance_layer_copy = "1111") | | |
| do { | | |
| instance_layer_mirror | 4 | uint |
| } while(instance_layer_mirror = "1111") | | |
| for(instance_layer = 2; instance_layer < instance_layer_copy_num; instance_layer++) | | |
| decode_GDL() | | |
| for(instance_layer = 2; instance_layer < instance_layer_mirror_num; instance_layer++) | | |
| decode_GDL() | | |
| } | | |
| } | | |

FIG. 33-3

ENCODING IMAGES OF 3-D OBJECTS WITH IMPROVED RENDERING TIME AND TRANSMISSION PROCESSES

REFERENCE TO PROVISIONAL APPLICATION

This application is based in part on Provisional Application number 60/098,150 filed 08/27/1998.

FIELD OF THE INVENTION

This invention relates to topology and geometry compression and coding schemes used in interactively creating, manipulating and transmitting 3-D geometry, especially through remote networked environments.

BACKGROUND OF THE INVENTION

Demand for 3-D imagery in entertainment, advertising, education, medicine, CAD, architecture and elsewhere, is high and increasing. As a result, there is a growing need for more efficient rendering of scanned images of 3-D objects; and more error-resistant transmission and reception of these through error-prone internet, broadcast, and wireless networks to a remote location.

Digital representations of stationary 3-D objects typically consist of large numbers of discrete polygons, encoded by various methods to reflect location, geometric, connectivity, texture, and other surface characteristics. One of the promising current modeling processes involves the use of surface models made up of triangles. Much research for this model has centered on geometry data compression, and incremental and progressive streaming modes of geometric model transmission. An ongoing challenge is to design efficient data structures that encompass both the compactness of a geometric compression scheme and the superior visual quality of a progressive representation.

In an error-prone communication environment, however, it is necessary to also have a more robust mechanism over an unreliable network because data packets may be corrupted or lost. Once an error occurs, quick recovery should be promptly processed for direct interaction with the remote 3-D data set. The decoder must be able to synchronize and continue decoding the received stream instead of requiring retransmission from scratch. To transmit large compressed 3-D data, it is therefore desirable that the encoded bit stream also supports incremental transmission. That is, the receiving party should be able to decode and display whatever information it has received from the server without retransmission.

The fundamental idea in progressive transmission is that most important information of an object is sent first, followed by a series of details. The most important information forms an object at the coarsest level of resolution. The details are used to successively update the coarsest and intermediate meshes. The advantages that progressive transmission offers are numerous: high performance, embedded bit stream which can be truncated at any point by the decoder to create the best corresponding reconstructed 3-D object and exact bit rate control.

Another efficiency currently being applied in the digital representation of 3-D objects is mirroring. Mirroring is the taking advantage of left-right mirror symmetries such as are exhibited in faces/heads and body segments, biological organisms and structures, vehicles, machine parts, and furniture. Mirroring can substantially reduce the amount of data needed to reproduce an image, by transmitting a left-image and then for the right image, only information as to slight asymmetries. The utility of mirroring, however, is in part dependent on availability of an efficient coding, transmission and decoding of the slight asymmetries.

Several teachings in the prior art directed generally to efficient coding, transmission and decoding of 3-D images are noteworthy. One process described in "Arbitrary Topology Shape Reconstruction from Planar Cross Sections", Bajaj et. al.; *Graphical Models and Image Procession*, 58, 6 (1996), 524–543, is to represent polygonal mesh connectivity as generalized triangle strips, and to compactly express a planar graph via stack operators such that the total number of random accesses to all vertices of the mesh is greatly reduced. Linear predictions are used to quantize and code the vertex positions and attributes. The compression ratio is usually not high, however.

The Topological Surgery (TS) method described in "Optimized Geometry Compression for Real Time Rendering", Chow, M. M., Proceedings of IEEE Visualization '97, 347–354, is a compression scheme over a set of manifold triangular meshes. TS organizes vertices of a mesh into a vertex spanning tree and triangles into simple polygons which are further grouped to a series of triangle strips. Vertex positions are predicted by linear combinations of the encoded positions of their ancestors in the vertex spanning tree. Geometry and connectivity encoding can be processed separately. The advantage of this scheme lies in its connectivity efficiency, about 2–3 bits per triangle. However, this scheme cannot handle non-manifold meshes directly; and currently it is difficult to design hardware supported decompression algorithms for it, because the random access nature of TS takes up too much bus bandwidth.

In "Geometric Compression", Deering, M., *Computer Graphics* (Proc. SIGGRAPH) (1995), 13–20, a further process is noted for decomposing a given mesh into several generalized triangular meshes, as well as a geometry and topology encoding scheme. While optimized for real-time rendering, the process is not compression-efficient.

Most existing compression methods only work correctly on manifold meshes or meshes of even more narrowed classes. To compress a non-manifold polygonal mesh, most methods need to convert it into a manifold mesh in a preprocessing step. In the article "Vector Quantization and Signal Compression", Gersho et. al.; Norwell, M A: *Kluwer Academic Publishers*, 1992, such a conversion process works by cutting-and-stitching operations over singular vertices and edges. However, since cutting-and-stitching operations ignore vertex coordinates, there may exist two connected components in the resulted manifold mesh that have coincident boundaries. The crack problem arises when positions of coincident vertices are quantized using different predictions.

The article "Vector Quantization", Grey, R. M. IEEE ASSP Magazine I, 2 (1984), 4–29, describes a mesh with recursive subdivision connectivity to approximate a mesh of arbitrary topology. Wavelets are introduced to do multiresolution analysis of meshes with such connectivity property. Hierarchical quaternary subdivision trees are used to organize the vertices which will be coded in a top-down mode. Prediction coding is used for vertex positions by means of surface fitting. This wavelet-based scheme does not, however, support lossless compression because most meshes do not have subdivision connectivity.

Another scheme suggested in *Handbook of Visual Communications*, Hang et. al. Academic Press, 1995 is the adaptive-refinement Progressive Mesh (PM). It stores a manifold mesh as a low resolution coarse mesh together with an ordered sequence of details that can be used to refine the coarse mesh. Edge collapse and vertex split are two basic operations. Each vertex split operation adds a new vertex and two new triangles and locally refines the coarse mesh. This method, however, also is not compression-efficient.

In the article "View-Dependent Refinement of Progressive Meshes", Hoppe, H., *Computer Graphics (Proc SIGGRAPHS)* (1997), 189–198, . . . , a lossy connectivity compression technique is described which outputs a progressively transmittable bit stream. The original simplicial mesh at different resolutions is expressed through successive edge collapse and merging operations, a scheme described in "A Method for the Construction of Minimum-redundancy Codes" Hufffnan, D. A., *Proceedings of the IRE* 40 (1952) 1098–1101. While not being an efficient coding method, its fundamental contribution is its support for the progressive transmission. The method is slightly improved by an idea provided in ["View-dependent Simplification of Arbitrary Polygonal Environments" Luebke et. al., *Computer Graphics* (Proc SIGGRAPH '97) (1997), 199–208, by integrating the structured bit stream and the attribute stream under certain optimized criteria.

Progressive Forest Split (PFS) described in Progressive Compression of 3-D Models, *IEEE Proceedings of Multimedia Computing and Systems* (Ottowa Canada, 1997), is a compact representation for any manifold mesh. PFS decomposes a given mesh by a low resolution level-of-detail and a sequence of forest split operations. The forest split operation is specified by a forest in the graph of vertices and edges of the mesh, a sequence of simple polygons, and a sequence of vertex displacements. In order to express each forest split operation, forest edges, sequence of simple polygons, and vertex displacements are coded into compressed data stream.

An approach for constructing smooth parameterizations of irregular connectivity triangulation of genus 2-manifolds, is described in "Hierarchical Structures for Dynamic Polygonal Simplification" Luebke, D., *Tech Rep. TR* 96-006, Dept. of Computer Science, Univ. of N. Carolina Chapel Hill, 1996. A hierarchical simplification technique is used so that a parameterization of the original mesh over a coarse base mesh is obtained. To get an approximation with a specified error bound, the base mesh is hierarchically subdivided by the Loop method described in "Surfaces from Contours", Meyers et. al., *ACM Trans. On Graphics, II*, 3(1992), 228–258. This multiresolution adaptive parameterization and remeshing technique can be used for progressive transmission of polygonal meshes in applications that do not require perfect connectivity recovery.

SUMMARY OF THE INVENTION

An improved topological layering scheme coupled with vector quantization provides in accordance with the invention a unique combination of compressing and encoding of both the topology (connectivity) and geometry (vertex coordinates) of arbitrary polygon meshes. The separation of topology and geometry encoding permits all combinations of lossy and lossless topology, as well as lossy or lossless geometry.

In the encoding scheme, a given mesh is first decomposed into contours. Then contours are constructed for each vertex contour and triangle strips and fans for each triangle contour. The multiresolution surfaces are constructed in two phases. The first phase requires two operations: intra-contour simplification and inter-contour simplification. The second phase provides flexible resolution degree and may change the mesh topology while the details are still expressed in some economical way. The contour construction uses a closed sequences of edges. The geometric primitives for the two basic kinds of contours, vertex and triangle, are encoded independently and alternately.

In a specific illustrative embodiment, connectivity information is expressed by defining a novel kind of triangle strip, created by an existing layered decomposition method. All vertices are grouped into separate layers; and each vertex layer is further divided into a set of contours and possibly some isolated vertices. A "generalized" triangle strip is the basic geometric primitive, and represents the set of triangles that lie between two adjacent vertex layers. Large numbers of long generalized triangle strips are developed. The invention teaches, in addition, using an exception strip, so-named because triangles are present therein which have "bubbles", that is, triangles for which all three vertices lie in the parent vertex layer; and in addition non-triangles or "holes". To encode a strip, whether exceptional or not, the process identifies the two starting vertices by a local index; the bit march, including length; and bubbles (including the number of bubbles) by both local and relative index. Contained in this information is all of the connectivity encoding needed for the far-end decoder to recover the original triangle strip.

Geometry encoding is improved by a novel productive vector quantization scheme which efficiently encodes vector coordinates of a given meshed object. In order to encode without accumulating error, the deviation of any vertex position is controlled to within the distortion of the productive vector quantization. The key is that once a correction vector is quantized, its distortion is merged into its following correction vector.

Progressive connectivity transmission is achieved by using both intra-layer decomposition and reconstruction; and inter-layer decomposition and reconstruction. The inter-layer transmission scheme eliminates having to encode a whole vertex layer.

The progressive geometry encoding uses a process of encoding vertices at the lowest level by a code difference approach. As resolution level increases, the prediction points for new vertices are first computed; and their corresponding correction vectors are then encoded by conventional PVQ techniques.

In a particular implementation, an improved mirroring process uses a geometry delta layer which specifies delta values to vertex positions of the mirrored or copied object. The delta values may be coded and transmitted in accordance with the techniques described.

As applied to the sending of 3-D images through a network, topology and geometry data obtained from a scanning of an object are encoded and a bit stream is created for progressive transmission in accordance with the teachings. The bit stream is transmitted through the network to a remote station where a decoder interprets and reconstitutes the encoded data. An image of the object is displayed on a monitor.

The advantages of these process innovations over prior methods, are their capability for handling arbitrary polygon meshes (high genus, non-manifold) and achieving higher compression ratios, while allowing for progressive transmission of the encoded geometry with error/distortion control parameters. These and other aspects, features and advantages of the invention are more fully elucidated below in an illustrative embodiment practiced in a network environment.

DESCRIPTION OF THE DRAWING

FIG. 33 is a table of operations for updating a mirror or animated image;

DETAILED DESCRIPTION OF AN ILLUSTRATIVE EMBODIMENT

Figure 1:
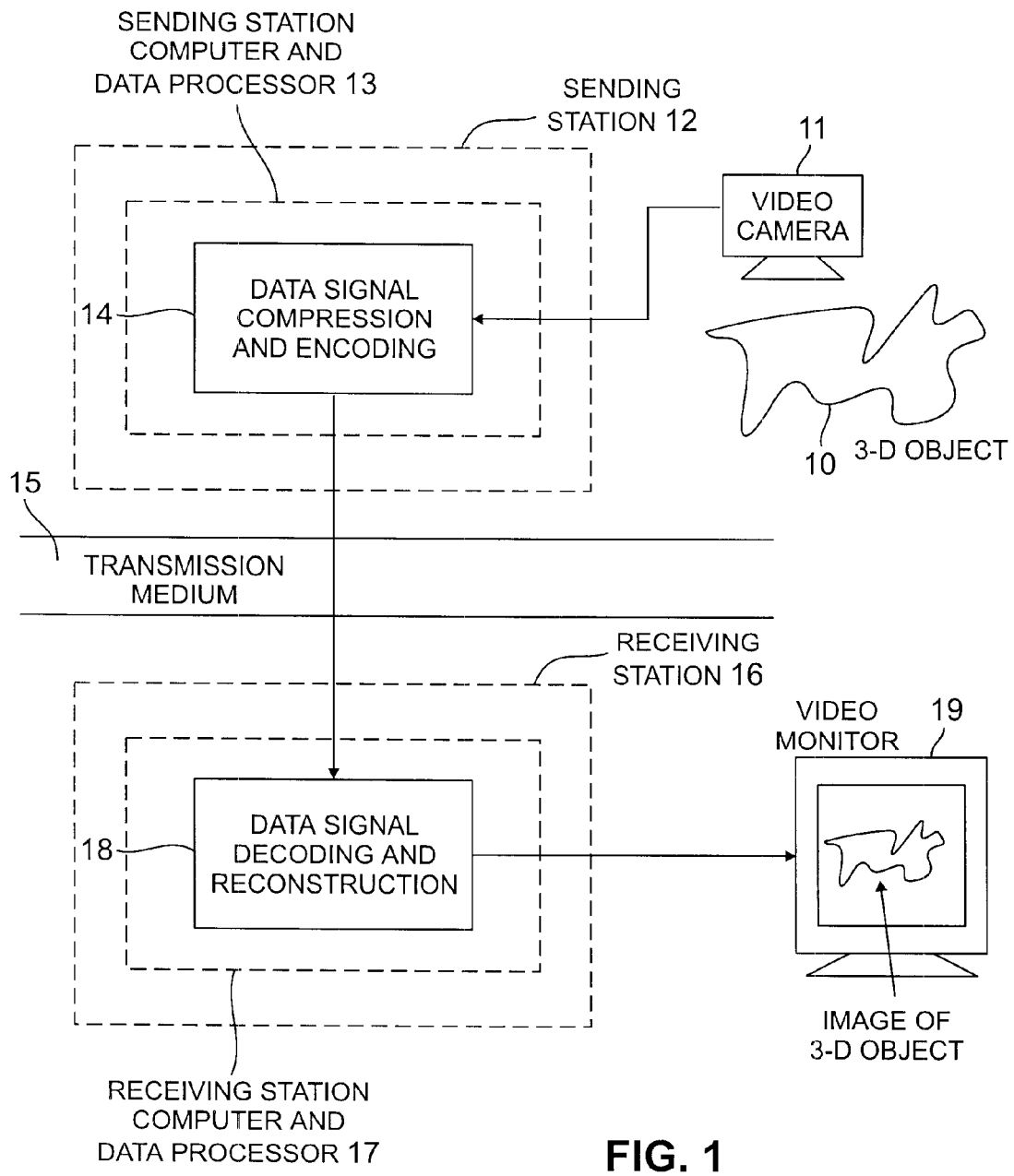
FIG. 1 is a schematic diagram of an end-to-end communications system using the invention.
Figure 2:
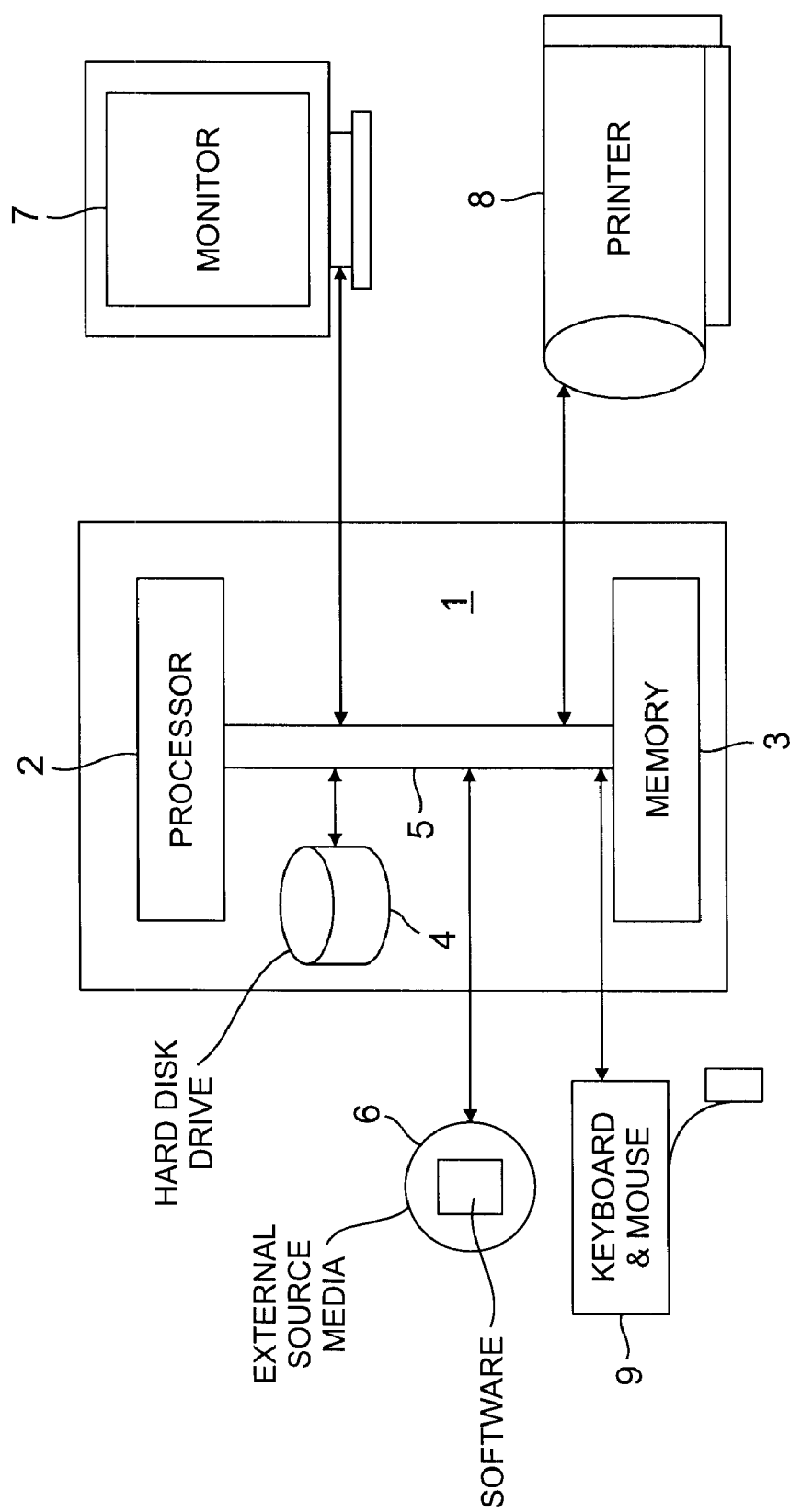
FIG. 2 is a generalized schematic diagram of the primary computer components needed in the system.

An exemplary environment for practicing the invention is depicted in FIG. 1. A generalized 3-D object 10 is scanned by a video camera 11. The signal from video camera 11 is directed to a sending station 12 with a computer and data processor 13 having the general construction as shown in FIG. 2. In practice, computer and data processor 13 may be a PC running Windows® 95, 98 or NT. Alternatively computer and data processor 13 may be a Sun or Silicon Graphics machine running UNIX®. Generally, 32 mbytes of RAM and processor speeds of at least 300 mHz are needed. The computer and data processor 13 is configured by conventional hardware or software means to have a data signal compression and encoding unit 14. Unit 14 contains in software a graphics engine which receives the video signal representing the object in 3-D and converts it into a 3-D topological contouring structure; and a data structure characterized by a layering scheme of the type described in detail in G. Taubin and J. Rossignac, "Geometric Compression Through Topological Surgery", *ACM Transactions on Graphics*, 1996, V17, 84 et. seq., which is hereby incorporated by reference. A rendering engine in unit 14 transforms the data representing the 3-D object to data representing 2-D images. Compression and encoding processes are performed on the 2-D images in a manner described below. The compressed and encoded signal is then further prepared for progressive incremental transmission in accordance with another aspect of the invention, through a transmission medium 15 which may be broadcast, coaxial or fiber cable, internet, or other suitable media, to a receiving station 16. There, the transmitted signal is decoded in a data signal decoding and reconstruction unit 18 which may be, for example, a suitably programmed machine such as computer and data processor 13. The 3-D image is displayed on a screen which might be a computer monitor 19.

As seen in FIG. 2, computer and data processor 13 includes a processor 2, a memory 3 and secondary storage 4 which is a machine-readable medium such as a hard disk drive. These components are interconnected by internal bus 5. Memory 3 may include volatile memories (DRAM, SRAM); and non-volatile memories (ROM, FLASH, EPROM and EEPROM). An external store 6 consists of machine-readable media such as floppy discs, removable hard drives, magnetic tape, CD-ROM, or other computers. The arrangement may also include for convenience a monitor 7, a printer 8 and mouse/keyboard 9, all connected to bus 5. External store 6 exemplifies media on which software for practicing the invention may be incorporated. Persons skilled in the art will recognize that a wide range of choices exist for locating the totality of software in a given computer installation. The operating system software, the software constituting the graphics engine, the rendering engine, the processes for decomposition, compression, encoding and progressive transmission, can be stored in memory 3, secondary storage 4 and/or external store 6. Executable versions of computer software can be read from non-volatile memory in memory 3, external storage 6 and/or secondary storage 4. The executable software may be loaded for execution directly into volatile memory; or may be executed directly out of non-volatile memory; or alternatively, stored in secondary storage 4 prior to loading into volatile memory for execution.

Layered Decomposition and "Special" Triangles

In accordance with one aspect of the invention, a novel kind of triangle strip which defines "special" triangles, is created using layered decomposition, in the following fashion.

Figure 3A:
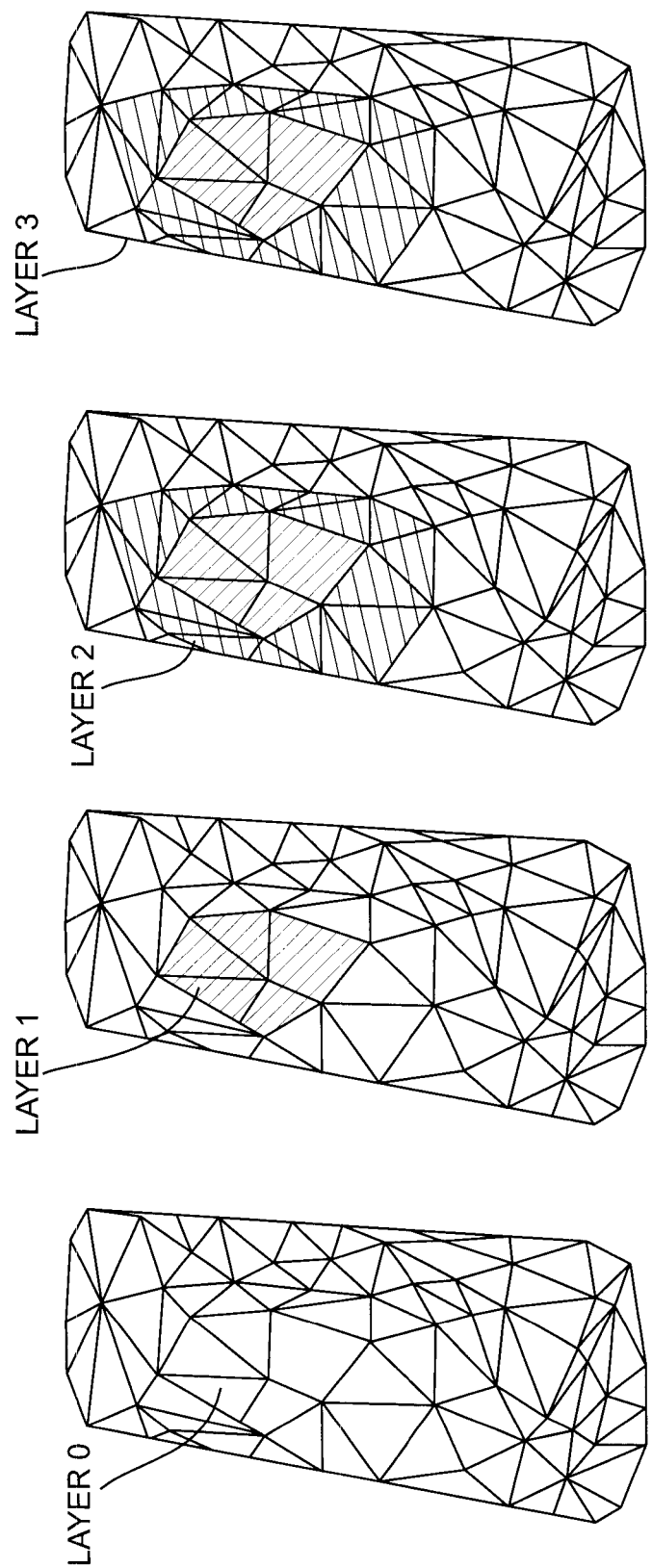
FIG. 3 is a sequence of diagrams illustrating layering as an adjunct in the decomposition of a dataset of polygons representing a 3-D object.
Figure 3B:
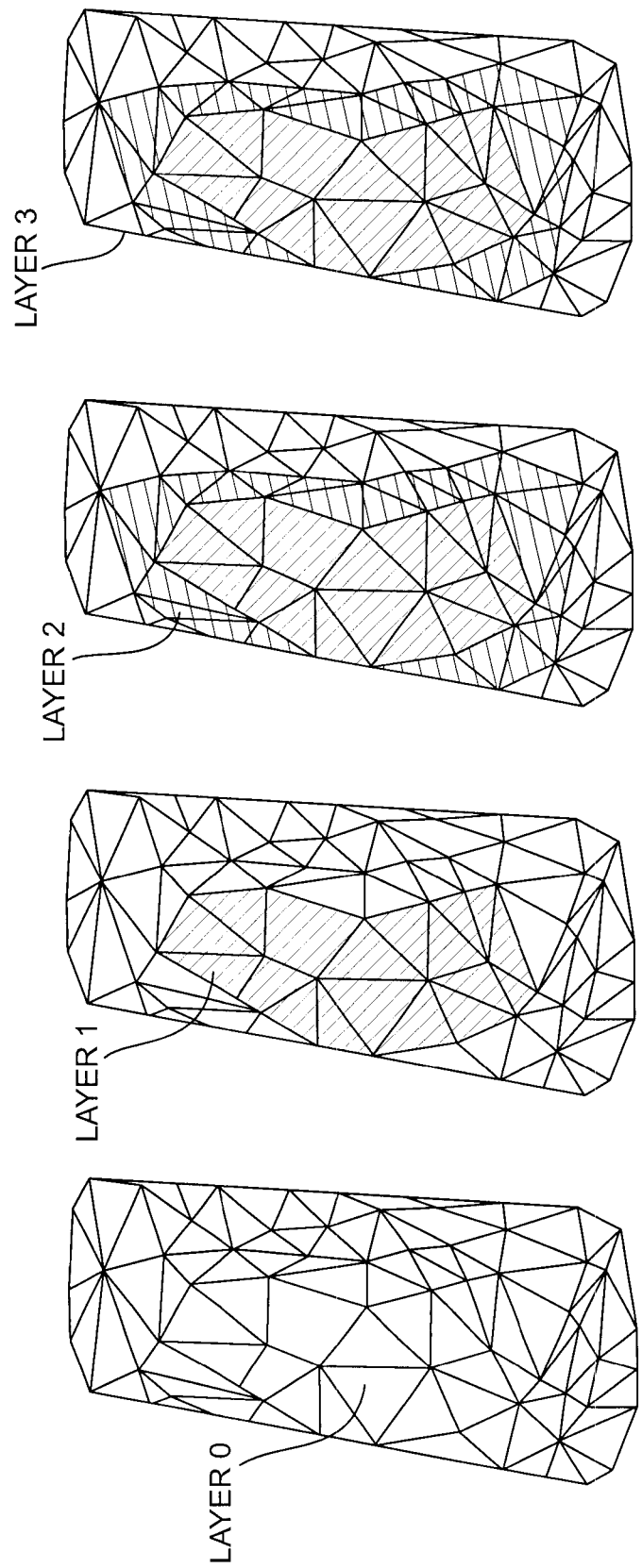
Figure 3C:
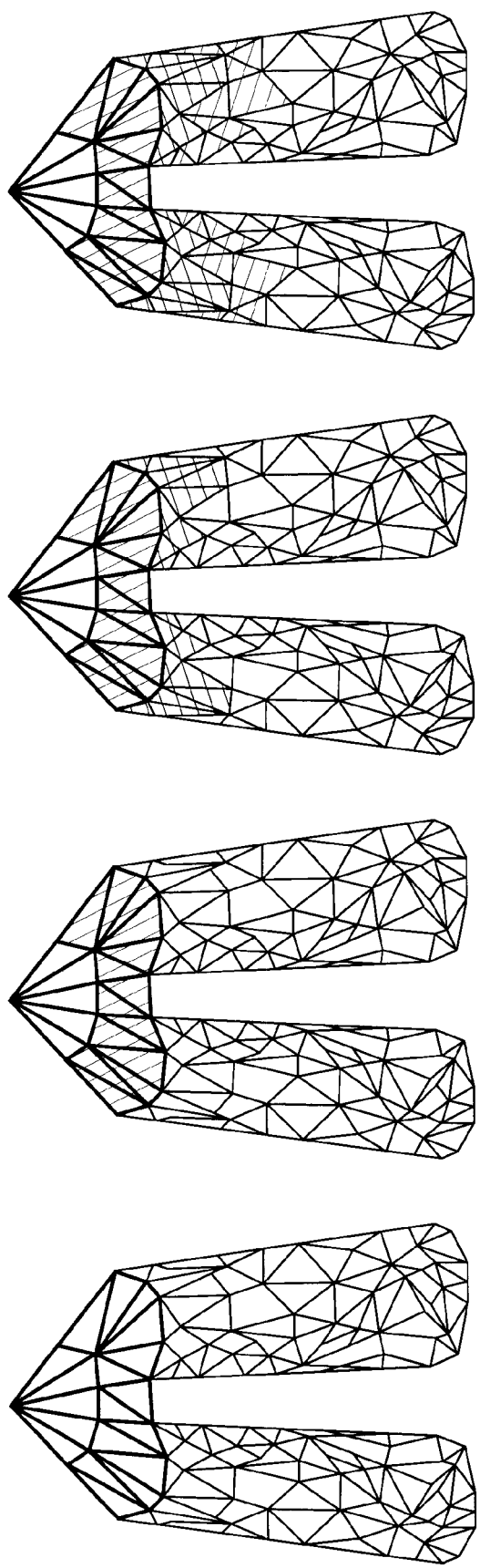

Using a database of vertices obtained from a scan of the 3-D object 10, all vertices are grouped into separate layers. Each vertex layer is further divided into a set of contours and possibly some isolated vertices. Referring to FIG. 3, a set of vertices are first chosen to make up the first vertex layer.

Usually these vertices form a contour or polyline. The $k^{th}$ triangle layer is composed of all the triangles, each of which has at least one vertex belonging to the $k^{th}$ vertex layer. The $(k+1)^{th}$ vertex layer is then defined as the set of vertices in which each vertex appears at least once in the index set of all the k-th layer triangles but does not belong to any of the first k vertex layers. Organizing vertices and triangles in this way has at least two advantages. First, the vertex layer is mostly composed of several contours (3-D polygons) or polyline (also called open contours). The spatial coherency in such expression can be used for efficient geometric compression and encoding. Second, the triangle layer can form a set of general triangle strips, to be defined below. The strips can be efficiently encoded by the bit march approach of Taubin et. al.

Advantageously, this process based on the layering scheme is very efficient on an important set of meshes, namely, tiling surfaces. A tiling surface is a triangle mesh which is reconstructed from planar cross sections for from volumetric images. If all the vertices in the bottom cross section are chosen as the first vertex layer, then vertices in any later vertex layer come from a single cross-section. A triangle layer is composed of all tiling triangles between two adjacent cross sections. If all cross sections are parallel to the XOY plane, then all vertices in any vertex layer have the same z value. Therefore, in accordance with the invention, a saving in geometric encoding results from encoding z values once per layer. This original idea of the present compression scheme may be generalized to deal with meshes of arbitrary topology.

Considering more closely FIG. 3, FIG. 3(*a*) shows the progressive layering construction starting from a single vertex, while FIG. 3(*b*) shows the case of the layer which is a contour. In both cases one performs the construction simply by grouping in layer i the vertices that are edge-connected to a vertex in layer i−1. The choice on layer 0 remains a free parameter, that in theory may influence the resulting layering structure. From experimental results, however, it has been found that the quality of the resulting layering, such as average number of layers, does not substantially change due to the initial choice.

The set of vertices in a single layer may not be connected by edges of the mesh. Here, a branching has occurred, so that a layer of vertices is decomposed into a number of contours. FIG. 3(*c*) shows a simple case where the initial layer at a certain stage branches into two contours.

Figure 4:
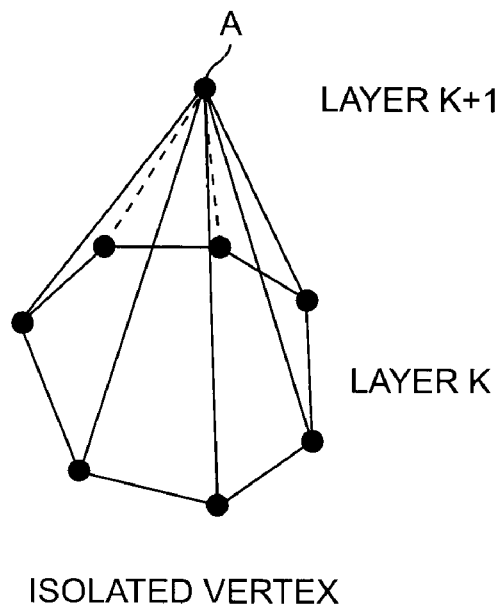
FIG. 4 is a diagram illustrating an isolated vertex that may appear in FIG. 3.
Figure 5:
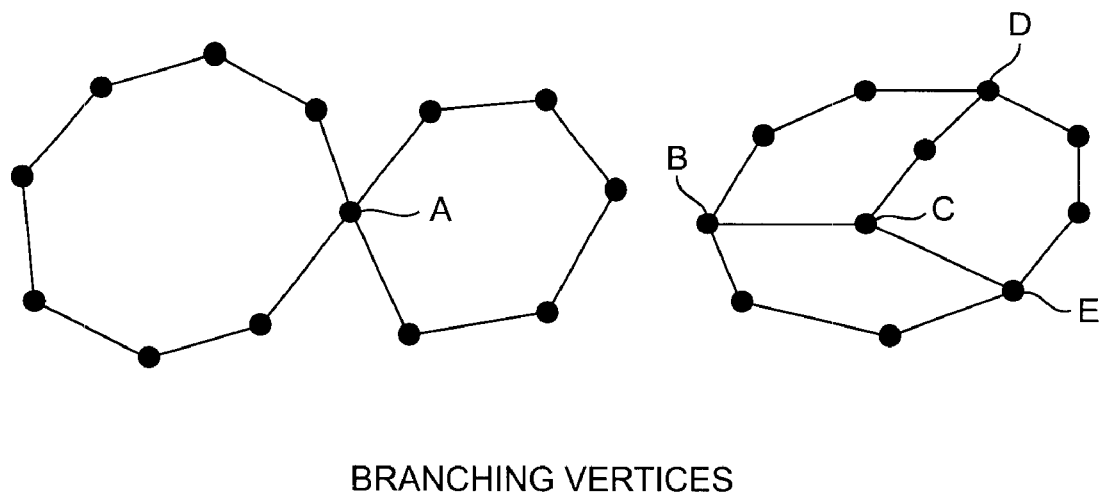
FIG. 5 is a diagram illustrating branching vertices that may appear in FIG. 3.

An edge that connects two same-layer vertices is called an "in-between edge". As mentioned above, vertices in a layer are grouped into contours which are either open or closed. Basically, these vertices are classified into three types. An isolated vertex is a contour of length one; and has no in-between edge. In FIG. 4, the vertex denoted A is an isolated vertex; these actually occur rarely in practice. A vertex is defined as a branching vertex if it is connected to more than two vertices in the same vertex layer. The four vertices A, B, C and D in FIG. 5 are all branching vertices. All the remaining vertices such as vertex E, are ordinary vertices. It is seen that an ordinary vertex usually has two in-between edges. An exception case is that an ordinary vertex has only one in-between edge if it is an endpoint of an open contour.

Figure 6A:
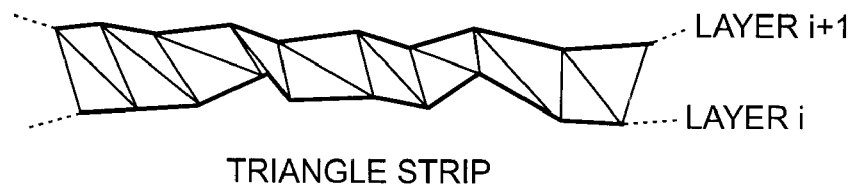
FIG. 6 is a diagram showing three types of triangle strips that may be assembled from the details of FIG. 3.
Figure 6B:
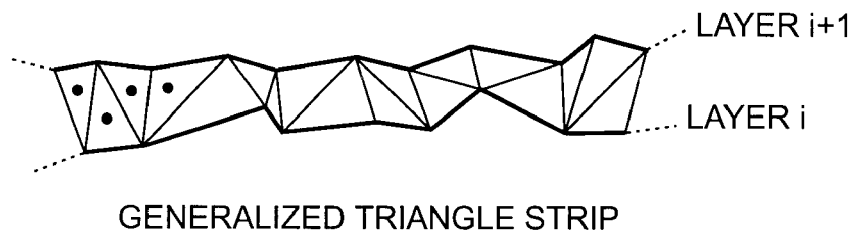
Figure 6C:
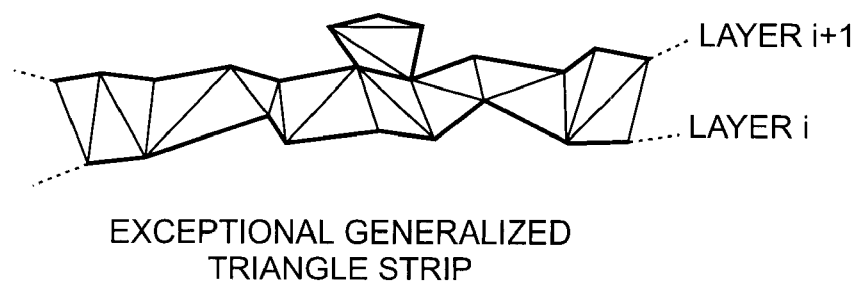

The basic geometric primitive of the present invention, is the generalized triangle strip, which is used to represent the set of triangles that lie between two adjacent vertex layers. By way of background, FIG. 6 shows a comparison between a triangle strip denoted (a) and a generalized triangle strip denoted (b). Note that an edge of the mesh either connects two vertices in the same layer (referred to as in-between edges) or two vertices in two consecutive layers (referred to as chords). Typically, a triangle has one vertex in one vertex layer and the other two vertices in an adjacent vertex layer. Focusing on the strip that connects the vertices of layer i to the vertices of layer i+1, all the triangles that have two vertices on the $i^{th}$ layer are marked with a 0 (referred to as parent march); and all the triangles that have two vertices in the $(i+1)^{th}$ layer are marked with a 1 (referred to as child march). A regular triangle strip has the sequence of triangle marks that alternate continuously between 0 and 1. Thus, the sequence of marks does not need to be stored since the strip is completely defined by the position of its starting triangle. In a generalized triangle strip, the preceding is not the case. Once one has the vertex layers, a bit string (one bit per triangle) is needed to encode the generalized triangle strip. This bit string (marks) is called a bit march.

To achieve the best compression ratio one needs to get the best encoding for the most frequent case. In accordance with one aspect of the invention, using a layered decomposition of the vertices of the mesh as described hereinafter, a large number of long generalized triangle strips are created. These are the basic geometric primitive to use for the compact encoding of the mesh.

Figure 7A:
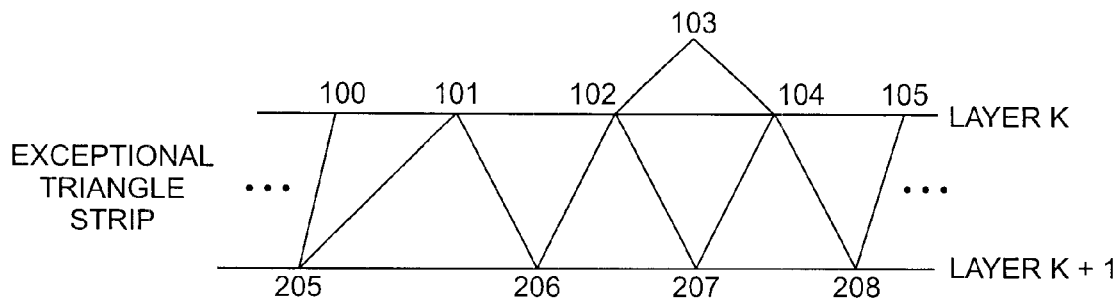
FIG. 7 is a diagram showing types of exceptional triangle strips.
Figure 7B:
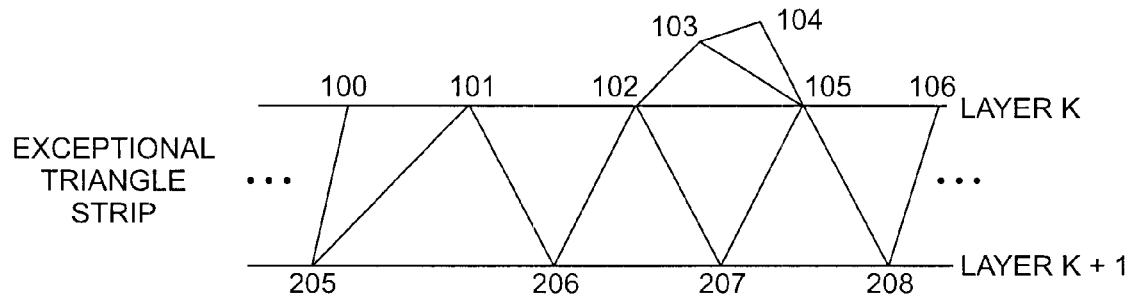
Figure 7C:
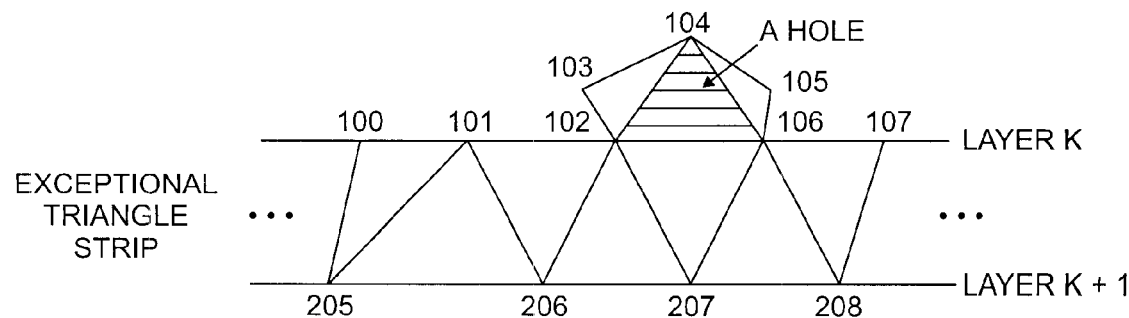
Figure 8:
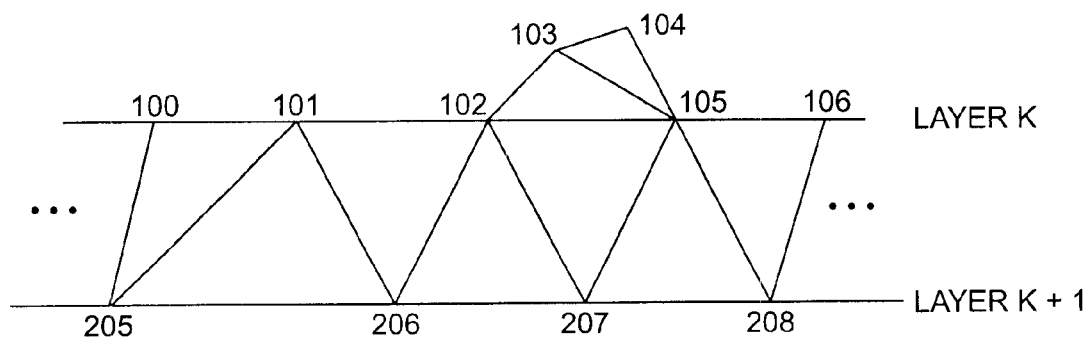
FIG. 8 is a diagram illustrating the coding of exceptional triangle strips.

FIG. 7 illustrates that the layered decomposition of the invention will also produce in addition to the generalized strip, an "exceptional" generalized triangle strip denoted (c) in FIG. 6. This more complicated strip is unique in the fact that there are "special" triangles or "holes" associated with the strip which are not present in the generalized strip of FIG. 6(*b*). To illustrate, referring to FIG. 7, the triangle (102,103,104) is a special triangle whose three vertices are all located in the parent vertex layer (Layer K). In the next case, both (102,103,105) and (104,105,102) are special triangles. In the last case, (102,103,104) is not an existing triangle; and hence it is termed a "hole". In the following discussion, a triangle is denoted "special" if all its three vertices are in the same vertex layer. A "bubble" denotes a set of special triangles associated with a strip.

For encoding a regular triangle strip (one without any associated bubble), the two starting vertices in the parent and child contours and the bit march determine the totality of connectivity information. In order to encode an exception triangle stripe efficiently, a relative indexing concept is used. Relative index is defined within a bubble in the following way. Suppose that a bubble spans n vertices and the index of the starting vertex of the bubble is X. The indices of these vertices are X, X+1, - - -, X+n−1. Then their relative indices are defined as 0, 1, - - -, n−1. In accordance with the invention, all special triangles are encoded by a triple of relative indices. For instance, the relative indices of 102, 103, 104, 105 in the case 2 of FIG. 7 are: 0, 1, 2, 3. The two special triangles are encoded as (0, 1, 3) and (1, 2, 3). Since n is usually a small number, encoding special triangles in this way is efficient because many bits are saved. Overall, to encode a triangle strip, the follow values must be included: the two starting vertices of the parent contour and the child contour, the bit march, the number of bubbles, and the bubbles. The two starting vertices are expressed by two local indices. The bit march will be encoded by Huffman coding as described hereinafter in connection with connectivity encoding.

Figure 10:
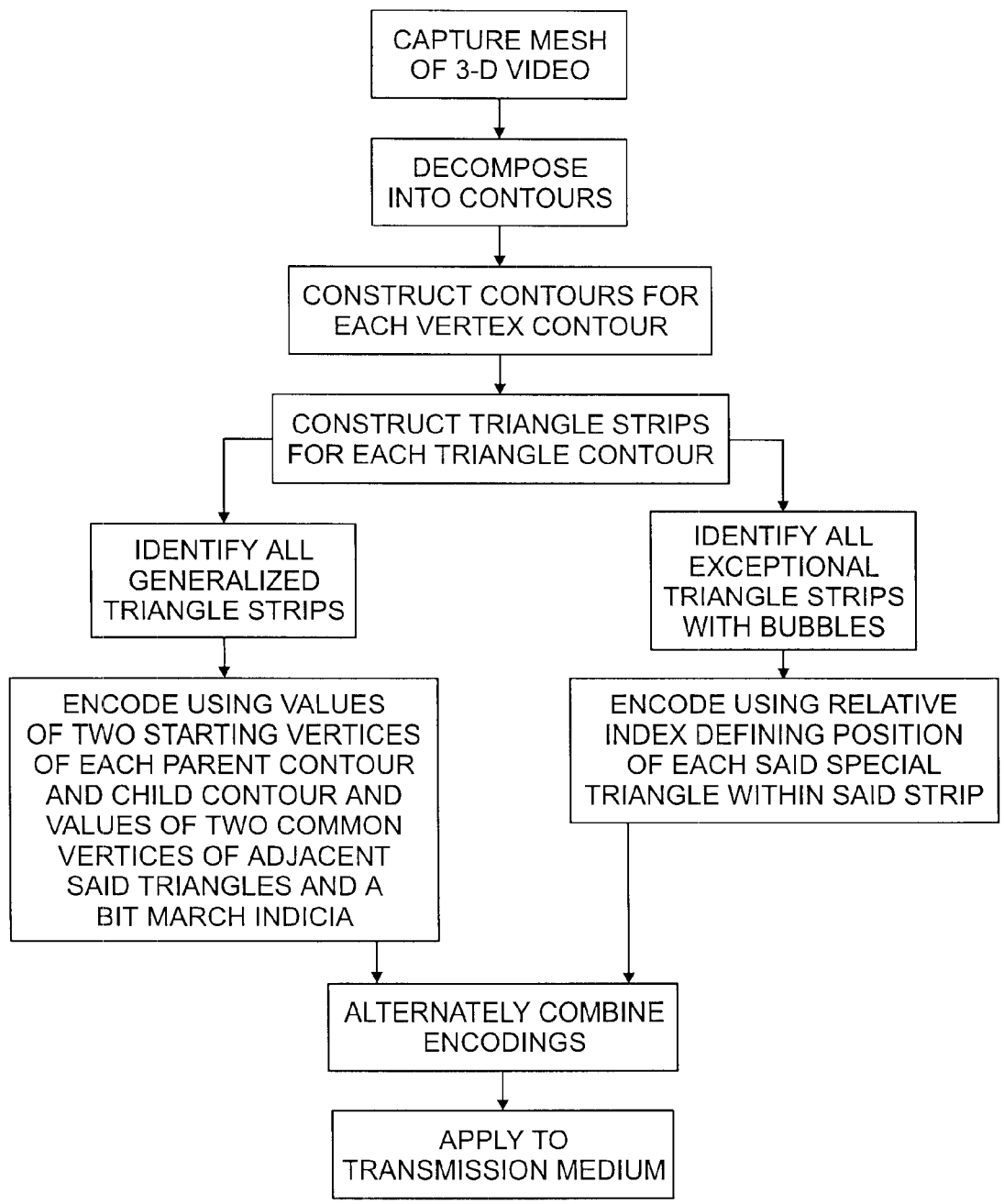
FIGS. 10, 11 and 12 are flow charts stating process steps in constructing, coding and transmitting of "special" triangles.

To perform global indexing, the vertices in the first vertex layer are numbered first, then vertices of the second vertex layer are numbered. The numbering process is repeated until all vertices of the last vertex layer are numbered. Suppose that V is the number of vertices of the given mesh. Then V−1 is the largest index which is in fact the global index of the last numbered index in the last vertex layer. Global indexing usually requires many bits to encode each of the vertices, because V is large for huge models. FIG. 10 states the sequence of process steps described above, from the capture of the vertex mesh of 3-D video images, including the separate encoding of generalized and exceptional triangle strips, and the alternately applying of the separate encodings in creating the transmitted signal.

Figure 11:
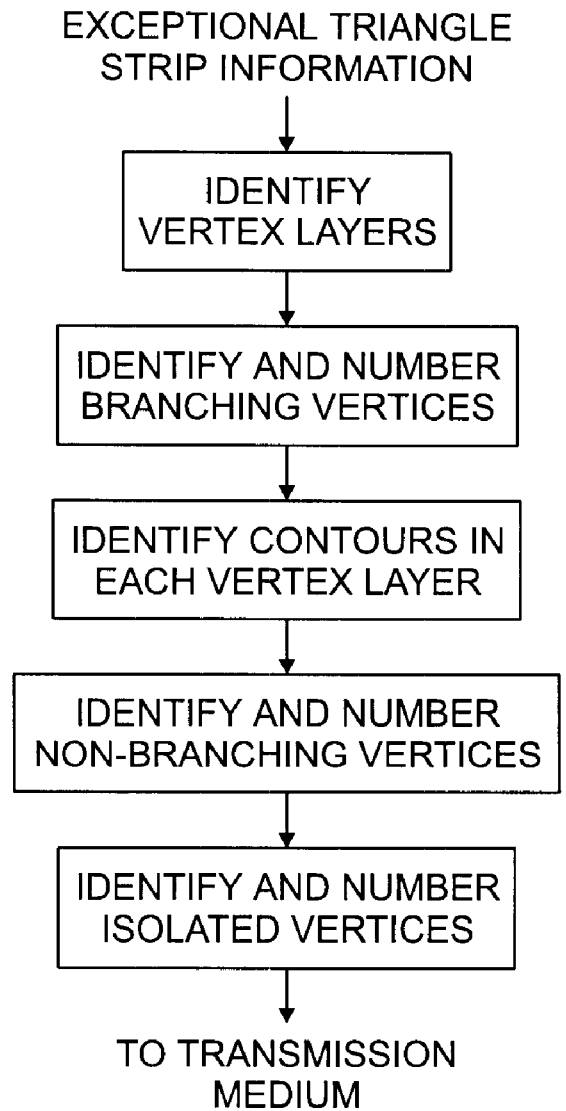

To reduce the number of bits required for indexing, the invention uses a concept of local indexing. For each vertex layer, all its vertices are increasingly numbered starting from 0. First, all the branching vertices are numbered. Then, for every contour in that layer, all non-branching vertices are numbered. The numbering order follows the order in which the contour is formed (counter-clock wise in the example). Lastly, all isolated vertices are numbered. If L is the number of vertices in a vertex layer, then the local index of any vertex in that layer will be less than L. Since L is much smaller that V, fewer bits are needed to encode a local index in comparison to a global index. Furthermore, the number of bits needed to encode a local index can be computed easily. It is simply the smallest positive integer K such that $2^K \geq L$. There is a one-to-one correspondence between global index and (layer, local index) pair. The global index of a vertex in layer K is equal to the vertex's local index plus the number of vertices of the first K−1 vertex layers. FIG. 11 flow-charts the sequence of process steps needed to generate the local indexing.

The type of triangle exemplified by (102, 207, 105) is called a "jumping" triangle. Its bit in the strip bit march must be set to "1". When recovering the connectivity, the decoder must know that there is a bubble when it processes the chord (102, 207). The decoder also needs to know how many vertices the bubble in the parent contour involves. A bubble is encoded by encoding the starting edge of the bubble (in this instance, edge (102, 207), and the vertex span (that is, the number of involved vertices) of the bubble in the parent contour. The bit march of the exception triangle strip is still . . . 1010101 . . . .

Figure 9:
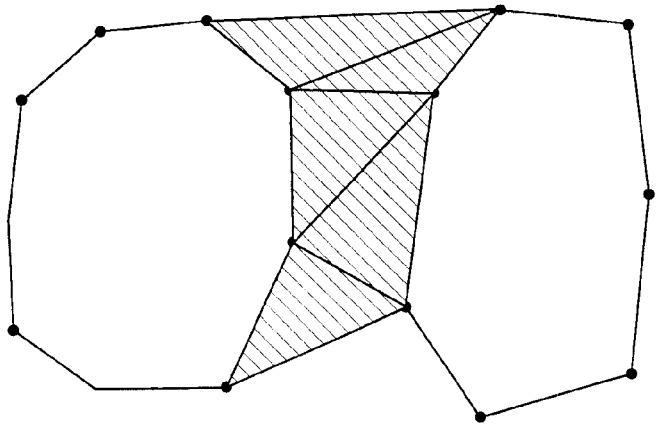
FIG. 9 is a diagram illustrating triangles that span more than one contour in a vertex layer.
Figure 12:
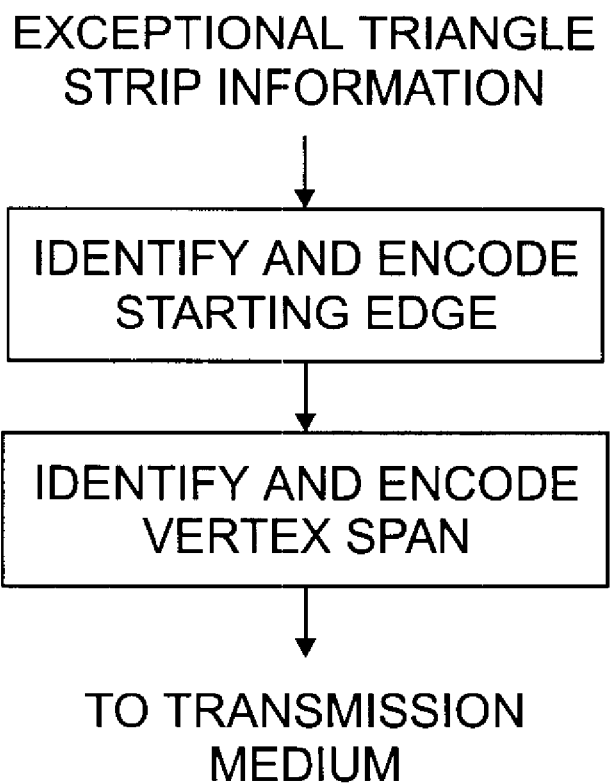

For each vertex layer, there are other kinds of triangles whose vertices are all in the current vertex layer and are in different contours. FIG. 9 shows some of these triangles. In FIG. 9, all vertices are in the same vertex layer. FIG. 12 summarizes the steps for encoding a bubble associated with a triangle stripe.

Therefore, encoding a strip (whether exceptional or not) includes generating: (1) the two starting vertices by local indices; (2) the bit march (including length); (3) bubbles (including the number of bubbles) by local and relative indices. This information is enough for the decoder to recovery the original triangle strip

Connectivity Encoding

Figures 13, 14:
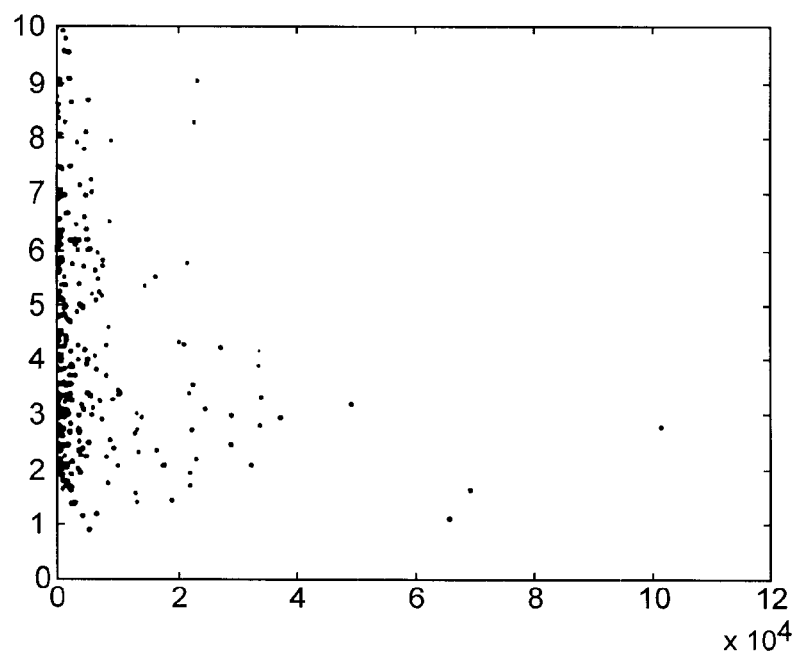
FIG. 13 is a static Huffman table for connectivity encoding.
FIG. 14 is a graph showing cost vs. coding for connectivity over many examples.

The connectivity encoding in accordance with the invention entails encoding all generalized triangle strips, and possibly some special triangles, as described above. For encoding ordinary strips which are expressed through bit marches, strings of 0s and 1s, it has been found that the patterns 0101 and 1010 appear more frequently in a typical bit march than other patterns such as 1111 or 0000. Thus, every four consecutive bits are grouped into a symbol. There are in total sixteen such symbols, as shown in the table of FIG. 13, to encode the bit march. The idea is to group each four consecutive bits in a bit march into a symbol. In case the length of a bit march is not a number of multiple four, the remaining bits (at most three) are grouped separately.

Based on many large models, statistics about the average occurrence frequencies of the sixteen symbols have been developed. The table shown in FIG. 10. is based on the classic Huffman coding algorithm. As shown in this table, symbols 0101 and 1010 appear more frequently, and so these symbols use less bits to encode. The connectivity encoding scheme of the present invention uses about 25% less space. FIG. 14 charts the results of more than 300 models. It is seen that optimum results are achieved for relatively large models.

If the layering scheme described above is considered from the standpoint of its representation power, it will be seen that it can represent any set of triangles with no constraint on their topology.

Geometry Encoding Using Vector Quantization

A vector quantizer is a system for mapping a sequence of continuous or discrete vectors into a digital sequence suitable for communication over constrained bandwidth channels. Vector quantization is a data compression technique to reduce the bit rate so as to minimize communication channel capacity or digital storage requirements with little compromise in the image quality so that necessary fidelity of the data is maintained. Descriptions of the relevant vector quantization prior art are found in the publications noted earlier.

In accordance with the present invention, an improved productive vector quantization scheme to efficiently encode vertex coordinates acquired in the preceding process, is advantageously realized in particulars of codebook design, nearest neighbor searching, and error/distortion control.

The layer decomposition technique described above groups all vertices by layers. Each layer consists of one or more contours which could be either closed or open. So the problem of geometry encoding is now reduced to the problem of encoding the geometry of vertices in a single contour. An efficient method has been realized that can encode coordinates without accumulating error, that is, the distortion from productive vector quantization. The key idea is that, once a correction vector is quantized, its distortion $\epsilon$ is merged into the following correction vector. Thus, instead of encoding and transmitting a correction vector $\Delta P_i$, a value $\Delta P_i + \epsilon_{i-1}$ is encoded and transmitted. The scheme may be better understood by the following description.

Let $P_0, P_1, P_n$ be the vertices which form a contour in that order. Define $\Delta P_i = P_{i+1} - P_i$ for i=0, . . . , n−1. The encoding scheme used for a single contour is:

Encode $P_0$ directly;
    Encode $\Delta P_0$ directly by its PVQ code triple $(r_0, \phi_0, \theta_0)$
        Compute $\epsilon_0 = \Delta \overline{P}_0 - P_0$ with $\Delta \overline{P}_0$ being the code vector
        of $\Delta P_0$ For i=1, . . . , n1,
    Compute the PVQ code triple $(r_i, \phi_i, \theta_i)$ of the vector
        $\Delta P_i + \epsilon_{i-1}$ Encode $(r_i, r_{i1}+N_r)$ mod $N_r$, $(\phi_i - \phi_{i-1}+N_\theta)$
        mod $N_{100}$, $(\theta_i - \theta_{i-1}+N_\phi)$ mod $N_\theta$;
    Compute $\epsilon_i = \Delta \overline{P}_i - (\Delta P_i + \epsilon_{i-1})$ with $\Delta \overline{P}_i$ being the code
        vector of $\Delta P_i$.

The full process for quantizing a correction vector, calculating it's distortion, and then merging the distortion into the following correction vector, are set forth in full in Appendix I.

The utility of the invention to enhancing progressive transmission, may be understood by considering both progressive bit transmission and progressive connectivity transmission.

Progressive bit transmission. For the case where only the vertex coordinate data is to be encoded and the given mesh is connected, then in order to apply productive vector quantization, a normalization step is performed over coordinates of all vertices. After normalization, the Euclidean length of each coordinate is smaller than 0.5. The normalization factor should be a integer of $2^K$. The integer K is encoded.

As earlier stated, vertices of the original mesh are grouped layer by layer; within any layer, vertices are further grouped by contours; and the first layer consists of a single vertex. Geometric encoding is then quite straight forward. Fully encode all the three coordinate components of the only vertex in the first layer, say, each with 32 bits. For the other vertices, linear prediction is used.

The encoding order is important. The vertex in the first layer is taken as the root. For each contour in the second layer, choose one proper vertex and regard it as one child of the root. In some fixed direction (for example, counterclockwise) the other vertices are encoded successively. For any two adjacent vertices within a contour, the first encoded vertex is regarded as the parent of the second one. For the other layers, a parent-child relationship can be built similarly. Overall, a vertex may have many children but has one and only one parent (the root is an exception). This relationship can be encoded quite efficiently because for any contour only the parent of the starting vertex (the first encoded vertex) must be encoded by a pair of integers: one integer indicates which contour the parent is located; the other integer shows the index of the parent within that contour.

With linear prediction, the correction for each vertex is defined as the coordinate difference between this vertex and its parent. Typically, the correction is a vector with three small components since edges in the original mesh are usually short. At least, the length of this correction is less than one, due to the normalization step. Productive vector quantization can be used for each correction. The resulting code vector is expressed by three indices pointing to the three sub-codebooks respectively. Indices can be encoded either directly or by using entropy coding.

Geometric encoding in the above way must take into account the possibility of error accumulations. In order to avoid this, the invention teaches an on-the-fly computing scheme. The principle is simple: to compute the correction, the parent coordinates are taken as the one that will be taken while decoding, not the exact parent coordinates. (unclear: explain better)

Progressive transmission of 3D compressed objects can be executed in two main directions. The first is progressive mesh as described in *Progressive Simplical Complexes*, Popovic et. al., Computer Graphics (Proc SIGGRAPH) (1997) 217–224. A coarse level object can be updated once enough details have come. The other direction is to perform successive approximation to the geometry data (specifically, vertex positions). Each coordinate may be encoded in several stages, according to the bit significance status of a float point or its residue. New residue is computed if some bits have been encoded and sent out. To encode a whole mesh, coordinates are first successively quantized. At the first stage, most significant bits are clustered together and each data is encoded by some fixed number of bits. The second stage is performed similarly, but this time on the most significant bits in the residue data. Once all bits in the original data have been sent out, the progressive procedure finishes.

In such a progressive transmission method using successive approximation, all connectivity data will be encoded at the first stage and will not be updated further.

Progressive connectivity transmission depends importantly on the connectivity decomposition of meshes. Two kinds of connectivity decomposition are used: intra-layer decomposition and inter-layer decomposition. Intra-layer decomposition eliminates about half of the vertices within each layer. Inter-layer decomposition eliminates half of the vertex layers in the mesh. In order to avoid creating very slim triangles, intra-layer decomposition and inter-layer decomposition are performed alternately.

In a preferred intra-layer decomposition procedure, half of the vertices of each vertex layer are decimated; and vertices in each contour are decimated alternately. For example, all vertices in a contour are numbered consecutively, and all vertices with odd numbers are to be eliminated. As a result of vertex reduction, the connectivity of the mesh changes. For each triangle strip, its bit march will be decomposed into a coarse level bit march and a couple of details. This decomposition is further divided into two phases. The first phase eliminates the candidate vertices in the child contour. Vertices in each contour are decimated by some fixed order, either counter-clock wise or clock wise. Vertex elimination in this fashion is tantamount to vertex merging: any decimated vertex is regarded as being merged to its front vertex. All incident edges in that strip move with the merged vertex. That is, these edges will have its front vertex as one end point. The detail associated with a removed vertex, is the number of its incident edge. For efficiency, it is still desirable to express the details by bit strings. If the incident edge number is m, then a string of length m is used to express it. The string is m–1 '1' bits followed by a '0' bit. The '0' bits are used as a separator. Here we have made use of the fact that $m \geq 1$. In the second phase of decomposition, decomposition is performed on the parent contour, in the manner as described above.

Figure 19:
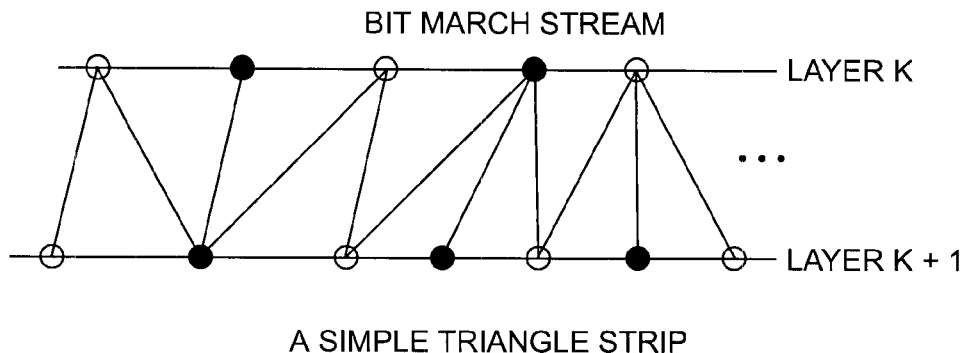
FIG. 19 is a diagram exemplifying bit march string in a simplified triangle.

To illustrate the preceding, FIG. 19 gives an example of a simple strip whose bit march string is "0110100010 . . . ". Intra-layer decomposition eliminates those vertices which are marked with "X"; the result is a coarse level triangle strip. The first step is to eliminate the black-labeled vertices in the child contour, which is Layer K+1. Then, the black vertices in the parent contour, Layer K, are eliminated. Elimination is performed by merging a black vertex into its front white vertex. At the same time, all its incident edges will move. This edge movement is recorded in the details.

Figure 20:
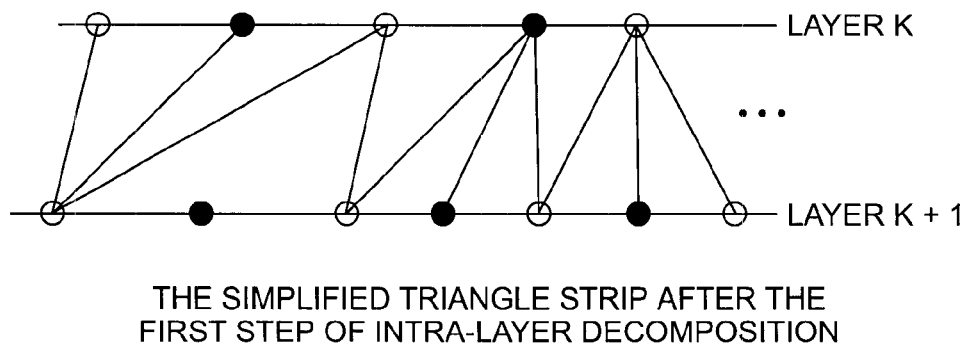
FIG. 20 is a diagram showing a triangle strip after the first step of intra-layer decomposition.
Figure 21:
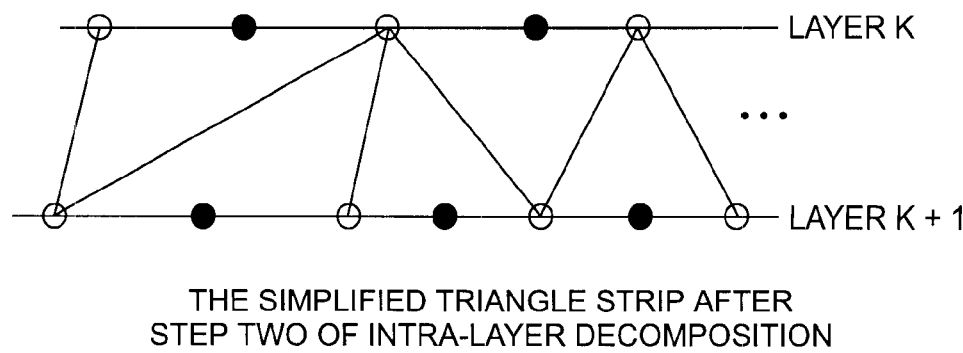
FIG. 21 is a diagram showing the same triangle strip after the second step of intra-layer decomposition.

FIG. 20 shows the strip after the first phase of the intra-layer decomposition. Now the coarse level bit march is "1101010 . . . ". The detail is '"11000 . . . ". "110 is the detail part that is associated with the first removed vertex. Since a total of three edges move with it, "11" expresses it. "0" is used to express the end of the detail part of the coding. Since there is only one edge moving with the second and the third removed vertex, the detail parts associated with them are both "0". Based on the simplified strip of FIG. 20, the second phase of the inter-layer decomposition is performed. The final coarse level strip is shown in FIG. 21. Its bit march is "10010 . . . "; and the detail is "010 . . . ".

Figure 22:
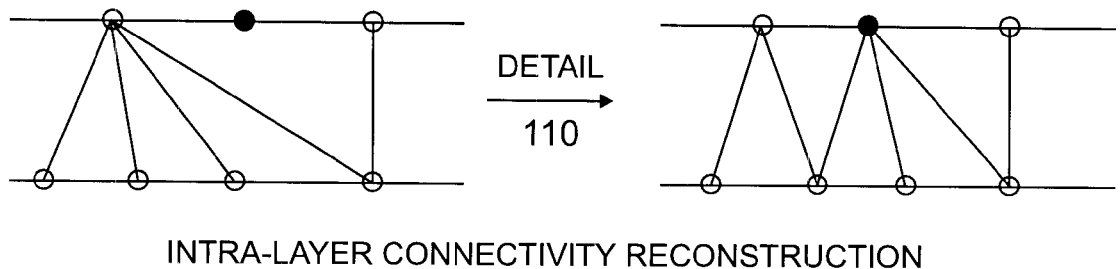
FIG. 22 is a diagram showing intra-layer reconstruction.
Figure 29:
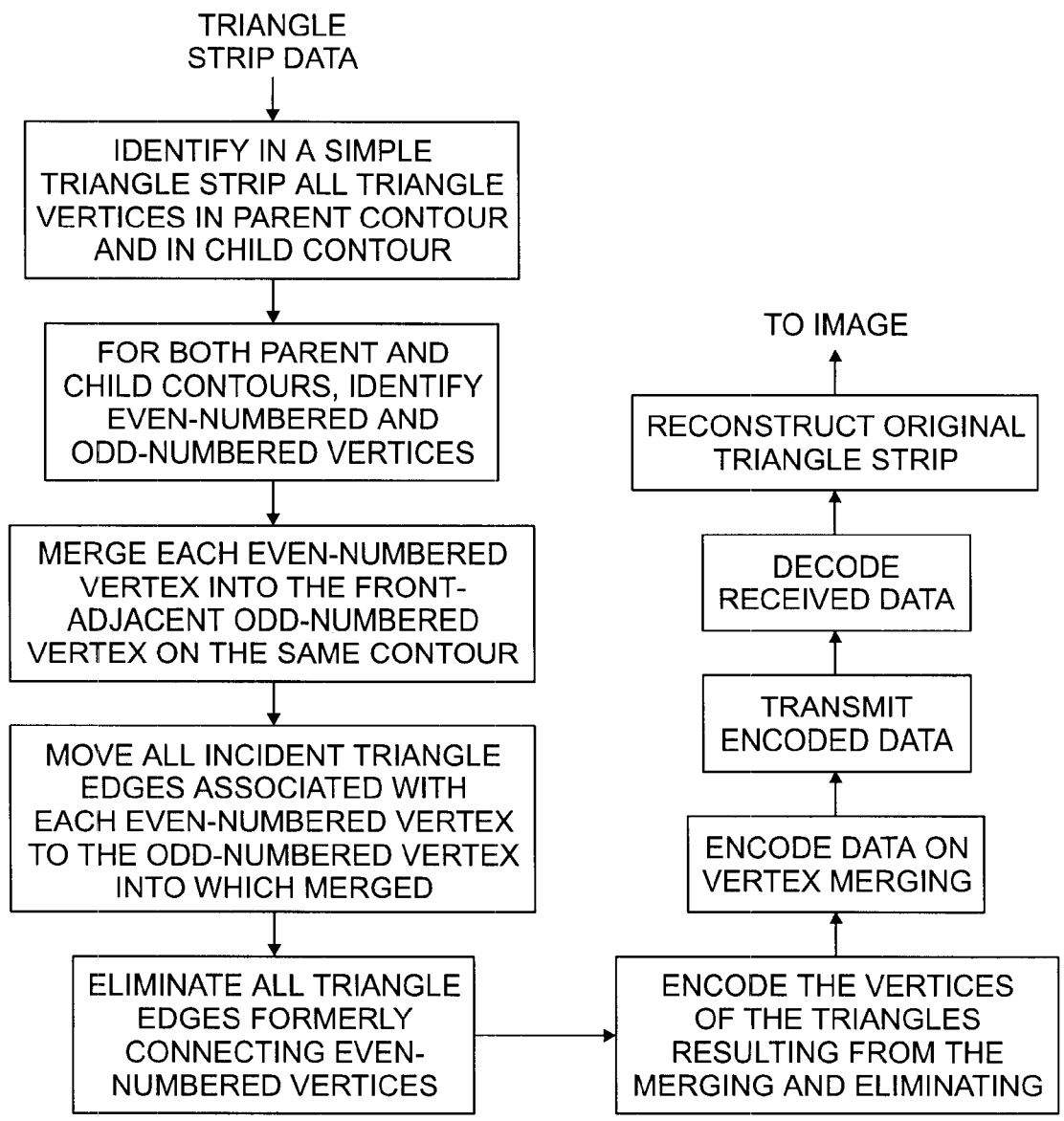

Intra-Layer Connectivity Reconstruction is straightforward. When a vertex is added back to a contour, the local connectivity changes as seen in FIG. 22. The detail as described above is used to move the incident edges back to the new added vertex, as is exemplified by the detail "110". FIG. 29 describes the steps of the intra-layer connectivity decomposition and reconstruction.

Figure 23:
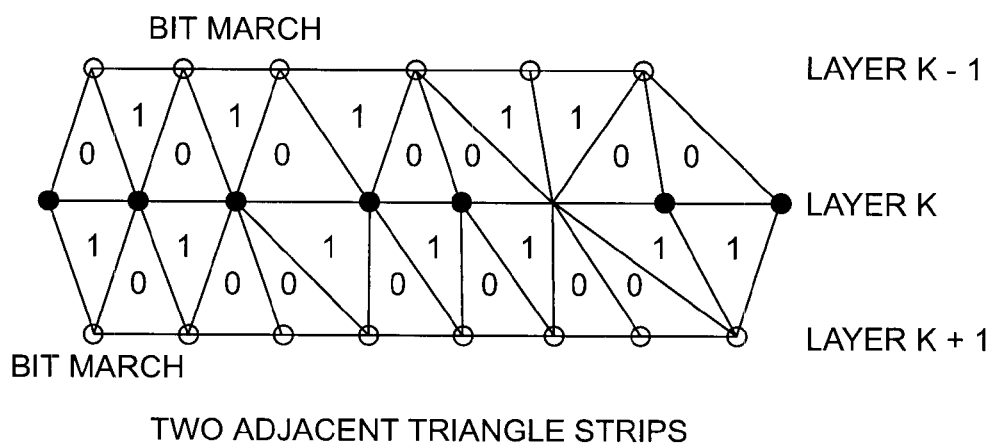
FIG. 23 is a diagram showing two adjacent triangle strips in inter-layer decomposition.

Inter-Layer Connectivity Decomposition If only intra-layer decomposition is performed, most triangles will become too slim, which creates an unfavorable aspect ratio. In accordance with another aspect of the invention, theretofore, a unique scheme of inter-layer decomposition eliminates a whole vertex layer. FIG. 23 shows two triangle strips with a common contour at Layer K. The bit march of the upper strip is "0101010011 . . . "; and the bit march of the lower strip is "10100101010011". It is evident that Layer K is the candidate to be eliminated.

Figure 24:
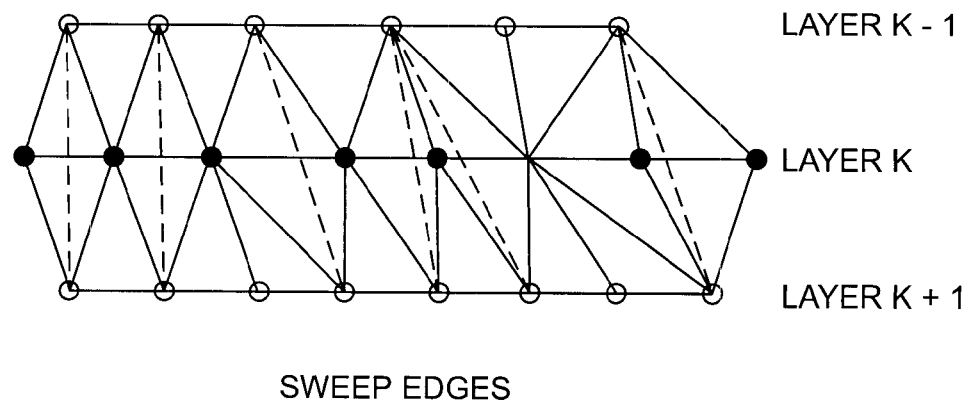
FIG. 24 is a diagram illustrating sweep edges.

The resulting simplified strip has layer K−1 as its parent contour and layer K+1 as its child contour. The vertices in layer K are eliminated one by one. When a vertex is to be eliminated, its boundary is first decided. The boundary is a 3D polygon as seen in FIG. 24. Its related detail part is vertex positions (that is, connectivity positions, not geometry) in the parent contour and the child contour. The positions of the leftmost vertex and rightmost vertex in the parent contour are needed, as are the positions of the leftmost vertex and rightmost vertex in the child contour.

A useful simplification is to introduce the concept of a sweep edge. A sweep edge of a candidate vertex is the line segment which connects two leftmost vertices in its boundary, one in the parent contour, one in the child contour. In FIG. 24, edge e1 is the sweep edge of vertex 1, and dashed e2 is the sweep edge of vertex 2. Once a vertex is removed, there remains a "hole". A local triangulation step is then performed: for an eliminated vertex, its detail part must record how the sweep line changes.

It is sufficient to use just the number of coarse level triangles between the two adjacent sweep lines which bounds that vertex. To encode a detail of integer m which is not less than 1, we again use a bit string consisting of m−1, '1' bits and a '0' bit as a separator.

Figure 25:
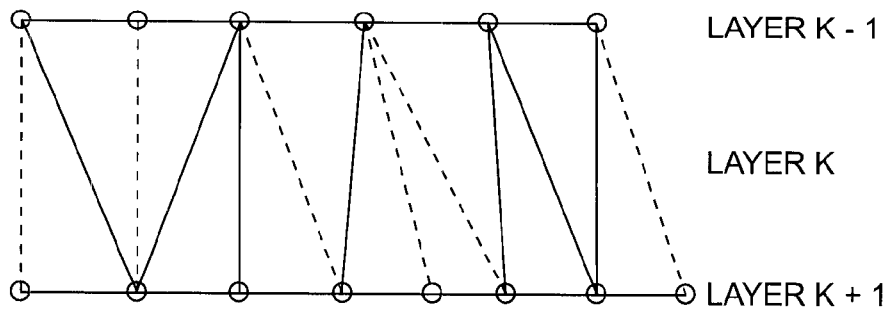
FIG. 25 is a diagram showing a simplified strip after inter-layer decomposition.

In FIG. 24; all dashed edges are sweep edges. These edges appear in the final simplified triangle strip as shown in FIG. 25. The detail parts from vertex I to vertex 5 can be encoded as 10, 110, 10, 0, 1110, . . . and the bit march of the coarse level strip is "011001001010 . . . ". It has been found using this process that if half of vertices in the fine level are thus decimated, then the number of triangles will be reduced by half. The cost of bit march strings is divided into two almost equal parts, one for coarse level bit march strings, one for the details.

Figure 30:
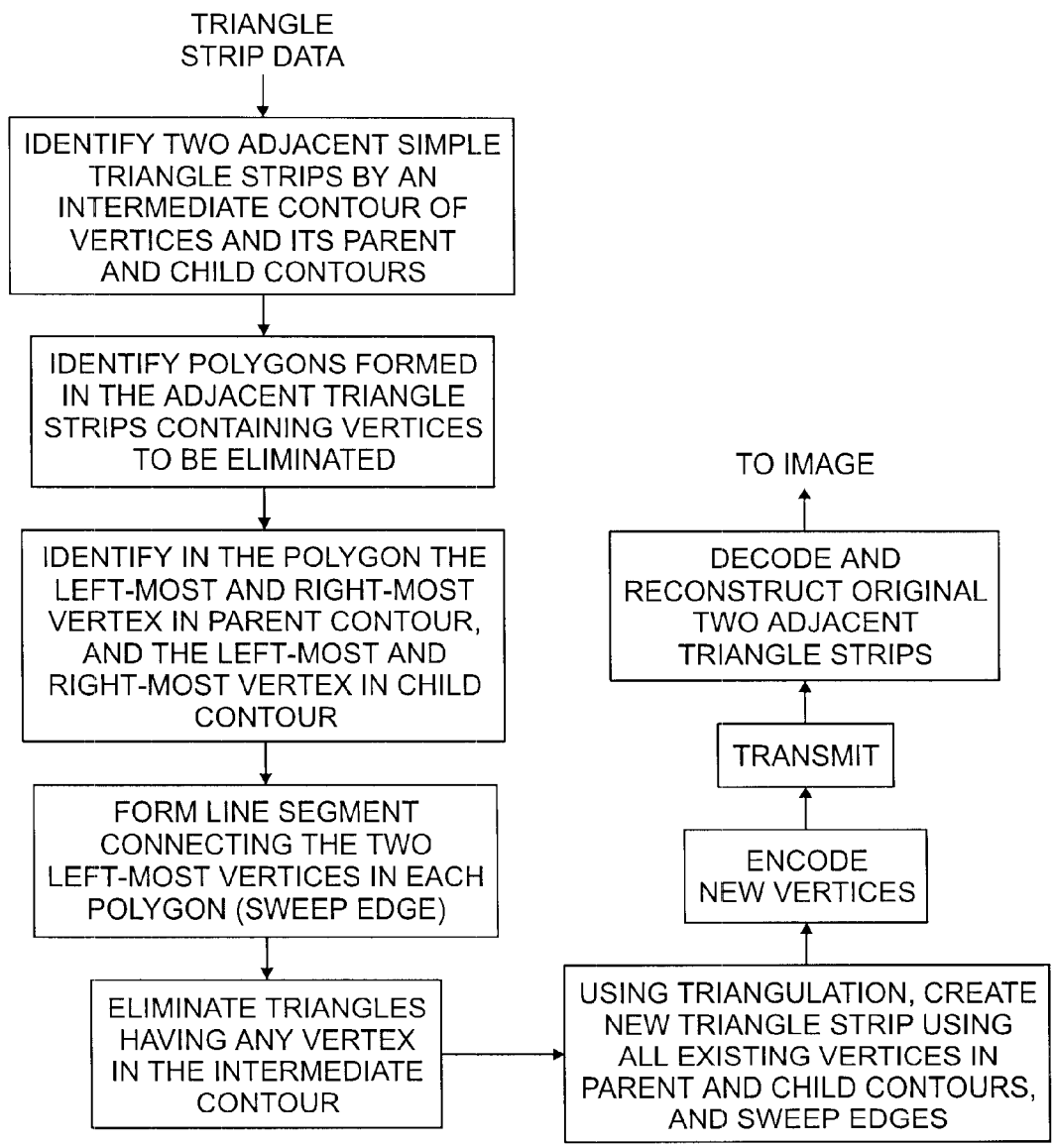

Inter-layer Connectivity Reconstruction When a vertex layer is added, vertices are added one by one. For each added vertex, the two sweep lines are first decided according to the coarse level bit march string and its associated detail. The two sweep lines decide its boundary. An edge to each vertex in the boundary for this added vertex is created. The inter-layer connectivity decomposition and reconstruction are charted in FIG. 30.

All three examples given above are regular triangle strips. However, the two-phase decomposition procedure can also be performed on exceptional triangle strips. Bubbles may move forward because of vertex merging. Also, the number of special triangle may change because vertex merge may produce degenerated special triangle. This is also true with respect to the second kind of special triangle, one whose vertices are in the same vertex layer but span more than one contour. In the intra-layer decomposition it may be advantageous to perform only one of the two described steps. Further, for a vertex layer with too small a number of vertices (for example, three) intra-layer decomposition may not be advisable.

Geometry Data Transfer in Progressive Connectivity Transmission

Figure 26:
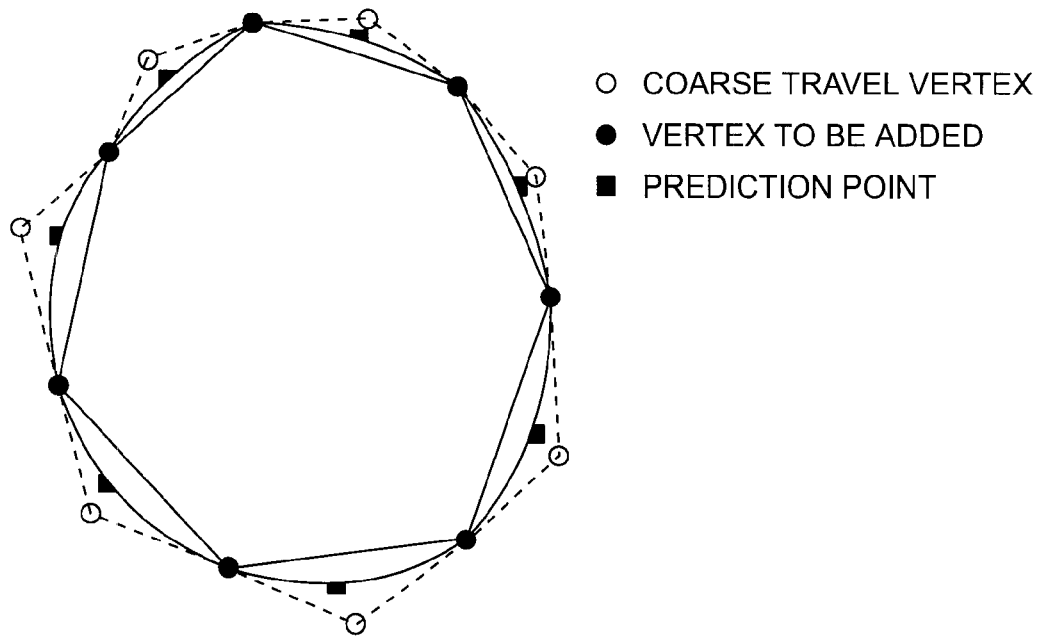
FIG. 26 is a diagram showing geometry data transfer.

The geometry position of each new vertex in finer level is encoded by linear prediction, with the prediction point determined by a quadratic parametric Bezier curve, as shown in FIG. 26.

A preferred way to choose the prediction point for a new vertex, is to use a single parameter i for all new vertices added to a contour. Mathematically, that single parameter can be computed by solving the following optimization problem:

$$\min_{t \in [0,1]} \sum_i \|P_i(t) - P_i^{k+1}\|_2^2.$$

Here, $\|\cdot\|_2$ is the Euclidean norm. Finding prediction points in this way produces better results with very small space cost.

For the geometry encoding part of the whole progressive transmission procedure, vertices at the lowest level are encoded by the code difference approach. As resolution level increases, the prediction points for new vertices are first computed. Their corresponding correction vectors are then encoded by PVQ. Bezier curves may be used to locate good prediction points.

Application to Bilateral Symmetry; Geometry Delta Layering for Nearly Symmetric Objects Because the process encodes connectivity and geometry separately, it is well-adapted to encoding left-right mirror symmetries. In accordance with a further aspect of the invention, a Geometry Delta Layer (GDL) is next described which specifies delta values to the vertex positions of the mirrored or copied object. This allows efficient coding of slight assymetries which effect only geometry and not topology of objects (e.g., faces).

Figure 31:
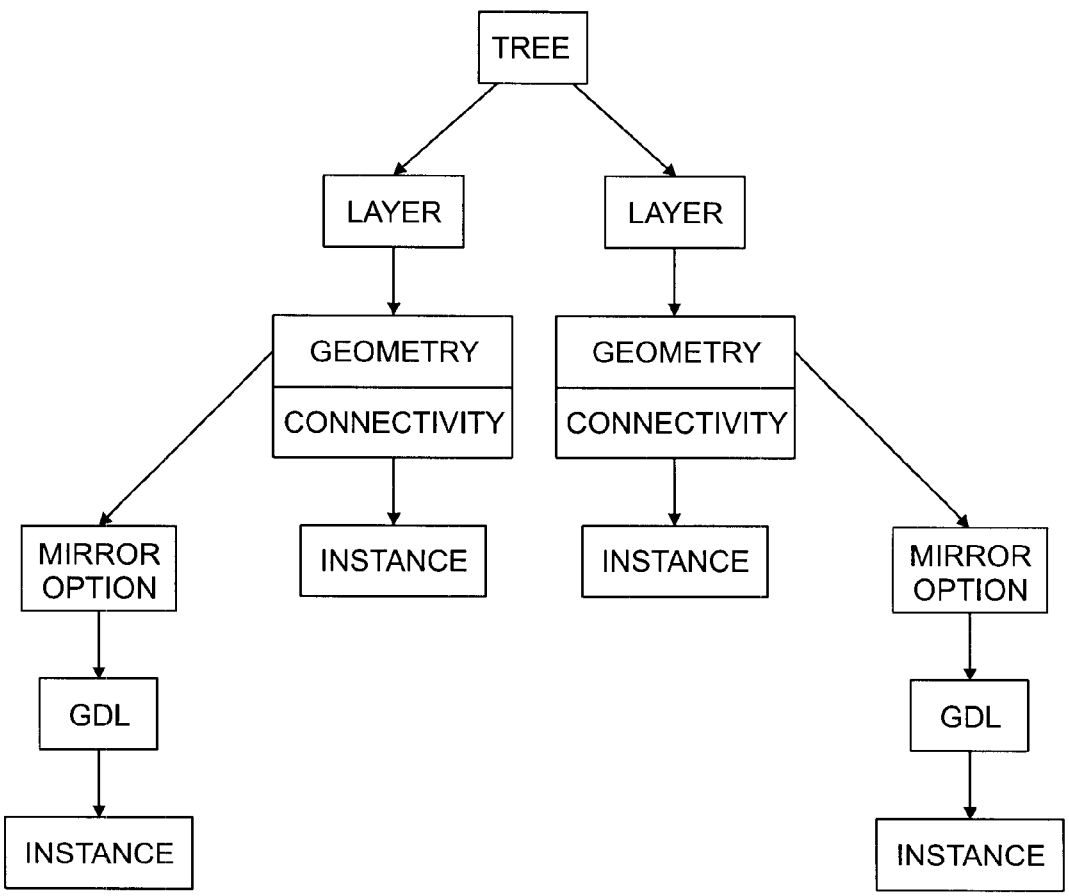
FIG. 31 is a diagram of the transforming and mirroring of tree data.
Figure 31:

VRML and MPEG-4 BIFS are current industry standards applicable to 3-D encoding. They allow copies of individual 3-D objects to be placed in a scene after spatial or property transformation. For example, a forest of trees can be composed of one reference tree which is translated and rotated many times. The communication of this forest scene is very efficient because only one tree needs to be transmitted. However, many natural and polygonal objects are composed of repeated instances of component parts which have undergone one or more transformations and small modifications. In these cases, the modifications to each instance of component part are costly to transmit using currently available graphics description standards. For example, a human head and body exhibits left-right symmetry with the exception of small (typically) asymmetries. The size of a human body model can be reduced by a factor of two by replacing one side by a reference to a mirrored instance of the other side. If the two sides are similar enough to share the same topology (vertex connectivity and number), the differences between them can be limited to differences in geometry (vertex positions). Other examples of 3-D models with symmetric or repeated components are machines and parts; biological structures (organs, plants, animals); vehicles; architecture; furniture; appliances; clothing; musical instruments; and celestial bodies. Additionally data structures in the form of trees such as shown in FIG. 31, may be transformed and mirrored.

Figure 32:
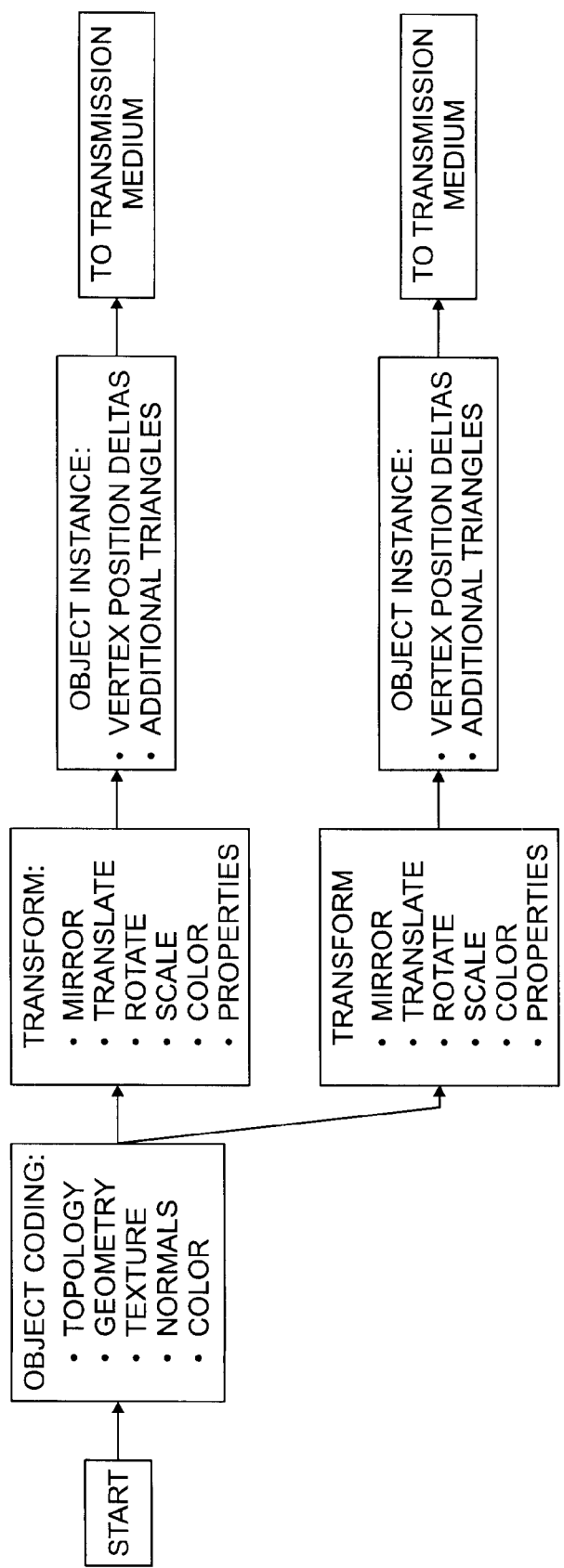
FIG. 32 is a chart of a generalized data structure showing encoding of various objects, then various transformations, and resulting instancings.

In accordance with another aspect of the invention, an efficient encoding of changes in geometry, or "geometry deltas" applicable to bilaterally symmetric 3-D objects is next described. As seen in the chart of FIG. 32, a given Object is coded as already described above. The coding may include topology, geometry, texture, normals, color, and more. Then, "Instances" of the Object, which are descriptions of a mesh, its vertices and connectivity, and referenced thereto ,are created. The placement of "Instances" of the Object in the scene being prepared for transmission, is done using a VRML or MPEG-4 BIFS Transform. Information on these Transforms is publically available; and may be found at the web site www.cselt/mpeg.

The geometry (vertex position) deltas are applied to the vertices of each instanced object assuming that the topology is unchanged from the reference (transmitted) object. The geometry deltas are coded using the same processes and bitstream syntax used for the 3-D object geometry as described above. A table showing an exemplary bitstream syntax is provided in FIG. 33; updates are designated in bold face.

Advantageously, the geometry coding processes allows the vertex position resolution to be specified as, for example, defining a threshold to determine which ones of the geometry deltas to transmit. In the case of geometry delta coding, the resolution is usually low allowing fewer possible delta values and a corresponding reduction in bit rate. Also, most geometry deltas are typically zeros which can be efficiently coding by selecting a variable length code for zero of 1 bit or less. Additional triangles can also be added using existing VRML or MPEG-4 BIFS syntax.

Figure 34:
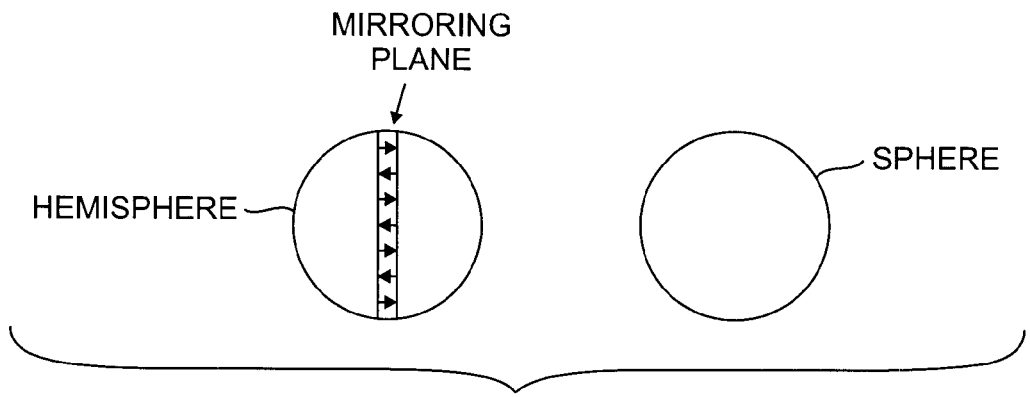
FIGS. 34 and 35 are sketches illustrating elimination of defects usual to mirroring.

The Geometry Delta Layering scheme provides a mechanism for solving several problems associated with mirroring. Specifically, a consequence of vertex position quantization is the introduction of error which can result in visible "cracks" or intersections between component objects. The crack is illustrated in FIG. 34 which depicts a hemisphere that has been approximated by a triangular mesh with quantized vertex positions. The sphere in FIG. 34 is formed by mirroring the unquantized hemisphere. However, the vertex quantization will in general displace the equatorial vertices denoted by arrows, away from the mirroring plane. A gap is formed between northern quantized equatorial vertices and the corresponding southern vertices at the equator. This crack (or overlap) can be compensated in accordance with the invention, by applying a GDL which collocates the equatorial vertices.

Figure 35:
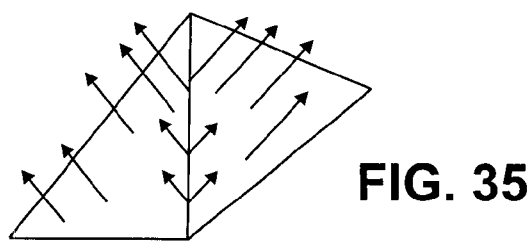

Further, various polygonal surface properties (e.g. shading and texturing) use the surface normals and surface normal interpolation to provide a surface with a smooth appearance. The situation is illustrated in FIG. 35. Surface normal interpolation between two polygons requires that the polygons be part of the same 3-D polygonal mesh (as opposed to separate polygons with a collocated edge). The mirroring of half an object to form a whole results in two polygonal meshes which will not be smoothly shaded across the boundary between the halves. This problem can be fixed by providing that the decoder shall always merge collocated vertices and edges between component meshes. If the quantization algorithm does not result in exact collocation, the process calls for the decoder to assume collocation if the vertices are within a specified small range of each other. This range can be a function of the quantization step size which is known in the decoder.

Objects in Motion. The improved connectivity and geometry encoding of the invention is also applicable to reducing the size of the data stream of animated 3-D polygonal models. Examples of objects which can be thus represented include animals, plants, waves, hair, fabric, data visualizations, smoke, and liquids. All of these objects can be primarily simulated with a static topology while animating the (in-motion) vertex positions.

In general, the animation of scenes of objects also requires insertion, deletion, and transformation operations. In accordance with the invention, the displacement of vertex positions as a function of time may be efficiently represented as a sequence of GDLs applied repeatedly to a given instance of object geometry. The geometry may be reset to the original values before each GDL application; or alternatively the geometry may be set to new values. Periodically setting the geometry using new absolute values (as opposed to previous values plus GDL) is needed in broadcast applications or in error prone transmission environments. In broadcast applications, the decoder must be able to decode the bitstream at an arbitrary time. This is only possible if the bitstream periodically contains animation information which is not dependent on previous transmissions.

Figure 36:
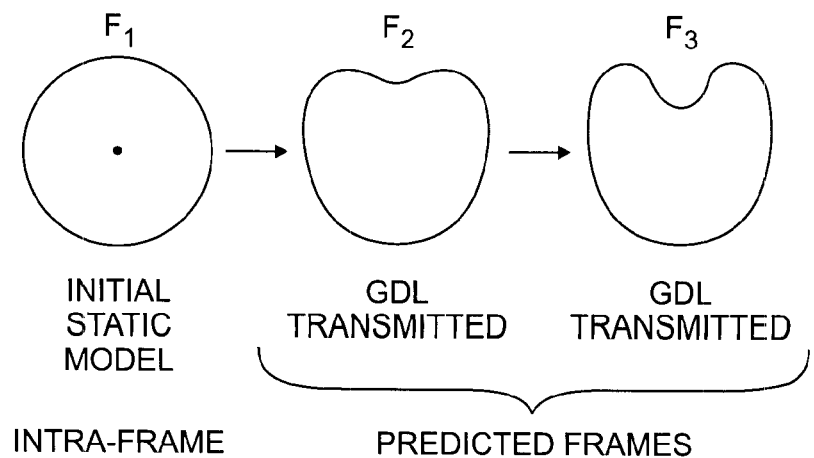
FIG. 36 is a sketch illustrating progressive transmission of geometry vertex position deltas.
Figure 37:
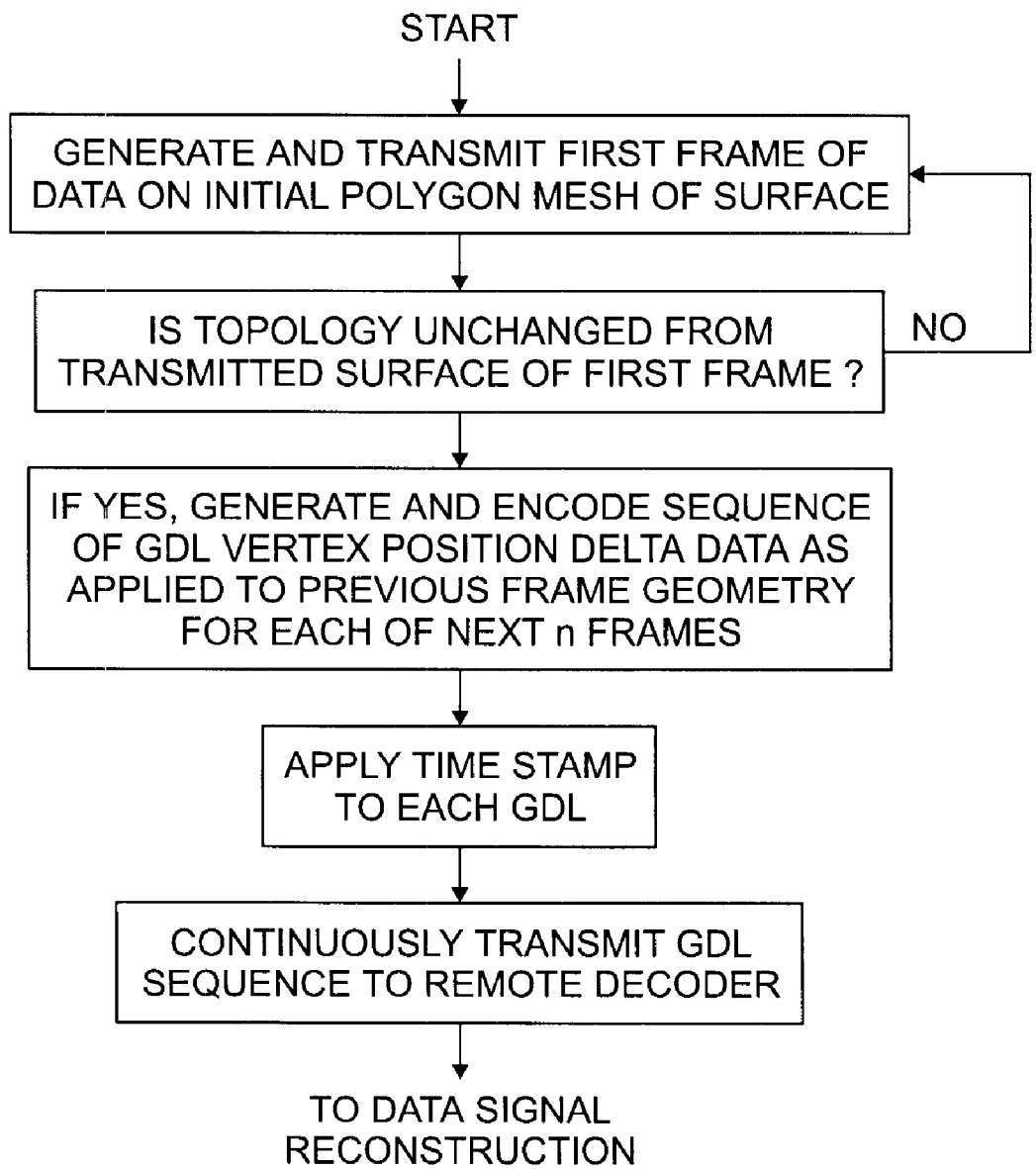
FIG. 37 is a flow chart showing generation and transmission of geometry vertex position deltas.

For a detailed example, consider the animation of waves on the surface of a liquid, as illustrated in FIG. 36. First, an initial static model of the surface, which is a polygonal mesh with properties as described above, is transmitted. The static model is shown as frame F1 in FIG. 36. Then the geometry is successively modified with a transmitted GDL for each frame applied to the previous frame geometry. The modifications are depicted in frames F2 and F3. Each GDL has an associated time stamp which is either transmitted or computed from an assumed frame rate. In a broadcast environment, a new static model is transmitted periodically instead of a stream of GDLs. If the topology is available on request, however, (e.g. from the internet or local storage medium), only the new absolute geometry must be transmitted. If the waves are exactly periodic, the decoder can store all of the unique frames of date for one period and replay them from local storage as indicated by flags in the bitstream. These frames of date my be stored compressed (transmitted bitstream) or uncompressed depending on available memory or processing power available respectively. The process practiced in the example is charted in FIG. 37.

In the most general implementation of the 3-D model animation using GDLs, the decoder stores all transmitted frames of geometry data for a given topology (of a polygonal mesh) and a given GDL for a given frame is signaled to be applied to any of the stored frames of geometry date to form the model for the current frame. This allows animations with more variety (less obvious periodicity) without continuous GDL transmission.

APPENDIX I

A productive vector quantization scheme to efficiently encode vertex coordinates acquired in the preceding process is advantageously realized in particulars of codebook design, nearest neighbor searching, and error/distortion control. The codebook design is derived as follows.

The sample space may be defined:

$$S=\{x|\|x\|_2 \leq 1, x \epsilon IR^3\}$$

Let the order set $C=\{y_1, y_2, \ldots, y_N\}$ be the codebook to be designed. N is the codebook size, which is adjustable according to the user-specified error tolerance. $Y_i, i=1, 2, \ldots$, and N are the code vectors.

A vector quantizer Q of dimension three and of size N is a mapping from a vector in S to a code vector in C. Basically, every N-point vector quantizer has an associated partition of S into N regions or cells, $S_i (i=1, 2, \ldots, N)$, where the ith cell is defined by $$S_i=\{x \epsilon S: Q(x)=y_i\}$$

The code rate of the vector quantizer Q is $r=(\log_2 N)/3$. The code rate measures the number of bits per vector component used to express the input vector. Generally, the code rate shows the accuracy of a vector quantizer, which depends on the quality of the chosen codebook. Clearly, large-size codebook gives good accuracy but results in a large bit rate, which means poor compression performance.

We present here a productive vector quantizer defined by three sub-codebooks. A vector (x, y, z) in S can be expressed in the sphere coordinates (r,φ, θ) by the relation $$r = \sqrt{x^2+y^2+z^2}, 0 \leq r \leq 1$$

$$\phi = \operatorname{atan}(y/x), 0 \leq \phi \leq 2\pi$$

$$\theta = \operatorname{atan}(\sqrt{x^2+y^2}/z) 0 \leq \theta \leq \pi$$

The three scalar r, φ and θ are encoded separately by using the following three scalar subcodebooks $C_r$, C and $C_\theta$ which are of size $N_r=2^{Kr}$, $N=2^{K\phi}$ and $N_\theta=2^{K\theta}$ respectively $$C_r = \{r_i | r_i = i - 1/N_r, \ldots, i=1,2,\ldots,N_r\}$$

$$C_\phi = \{\phi_j | \phi_j = 2\pi(j1)/N_\phi, j=1,2,\ldots,N_\phi\}$$

$$C_\theta = \{\theta_k | \theta_k = \pi(k1)/N_\theta, k=1,2,\ldots,N_\theta\}$$

A vertex thus will be encoded by $K_r+K_\phi+K_\theta$ bits. The overall codebook can be regarded as $$C = \{p_{ijk} := (x_{ijk}, y_{ijk}, z_{ijk})^T | i=1,2,\ldots,N_r; j=1,2,\ldots,N_\phi; k=1,2,\ldots,N_\theta\} \text{ with } x_{ijk} = r_i \sin\theta_k \cos\phi_j, y_{ijk} = r_i \sin\theta_k \sin\phi_j, z_{ijk} = r_i \cos\theta_k.$$

Nearest Neighbor Searching The squared error will be used as the error measure $$d(x, \hat{x}) = \|x - \hat{x}\|_2^2 = \sum_{i=1}^{3} (x_i - \hat{x}_i)^2$$

Figure 27:
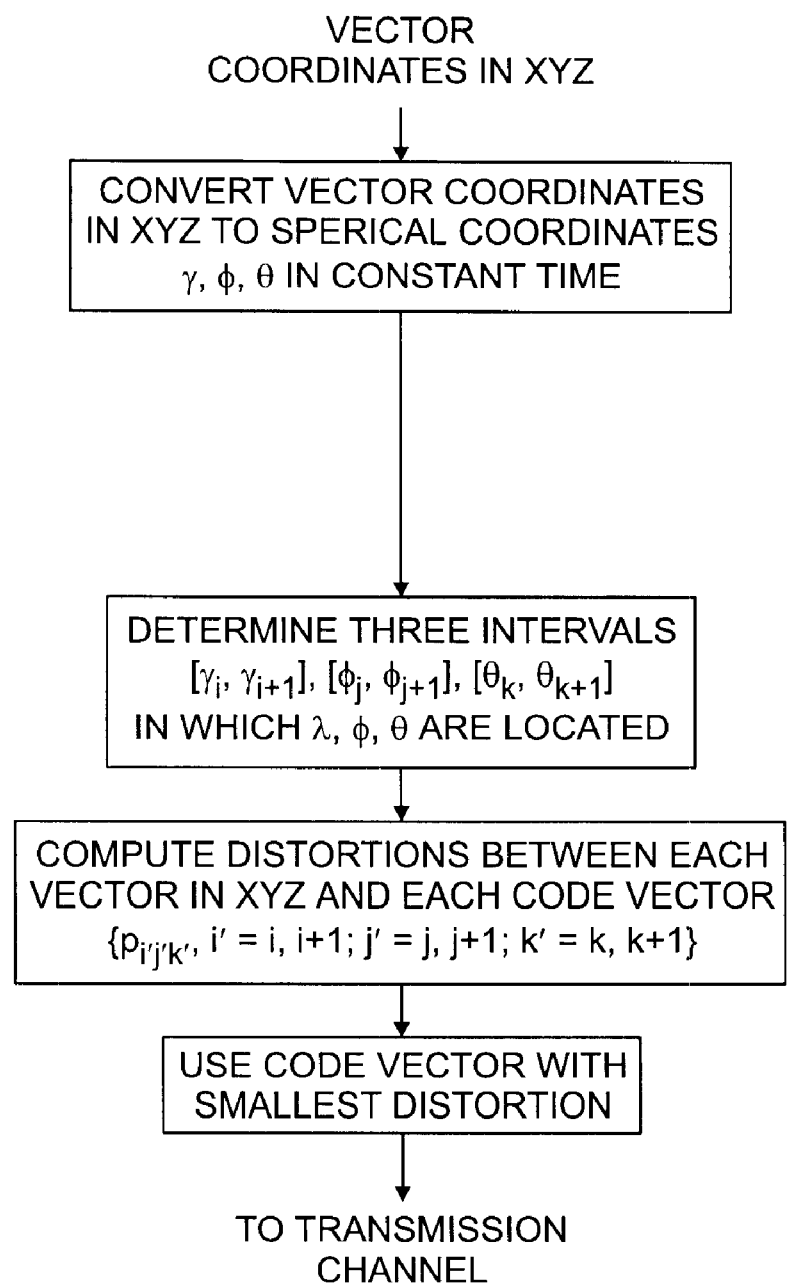
FIGS. 27–30 are flow charts stating process steps.

For a given vector x∈S, the task of nearest neighbor searching is to search for its closest code vector in the sense that it has minimal distortion $d(x, y_j)$ over all the code vectors in the codebook C. Naive linear searching is of O(N) time complexity. For the codebook given above, only constant time is required for a one-time nearest neighbor search. As depicted in FIG. 27, for any vector x∈S, its sphere coordinate (r,φ, ..., θ)) can first be computed in constant time. Then three intervals $[r_i, r_{i+1}]$, $[\phi_j, \phi_{j+1}]$, and $[\theta_k, \theta_{k+1}]$ are found, within which r, φ, and θ located respectively. Distortions between x and each of the eight code vectors $\{p_{i'j'k'}, i'=i, i+1;j'=j, j+1; k'=k, k+1\}$ are computed. Finally, since the distortion must equal one of eight distortion, the code vector can be easily decided by picking out the one which has the minimal distortion. All this can be done in constant time. Let PVQ(x) be that code vector and $$D_c(x) = d(x, PVQ(x))$$

Error Control Given a user specified error tolerance ε, one must decide the sizes, $N_r$, N, and $N_\theta$, of the three sub-codebooks. These three parameters should be chosen as small as possible so as to attain a small bit rate. The following quantitative analysis shows how the error control is directed.

For any vector x∈S, its associated sphere coordinates (r,φ, θ))must be located in some cube $[r_i, r_{i+1}] \times [\phi_j, \phi_{j+1}] \times [\theta_k, \theta_{k+1})$. So the distortion will not exceed half the length of the diagonal of that cube. $p_0 = (r_i, \phi_j, \theta_k)$ and $p_1 = (r_{i+1}, \phi_{j+1}, \theta_{k+1})$ are two endpoints of a diagonal. Suppose that $(x_0, y_0, z_0)$ and $(x_1, y_1, z_1)$ are their Cartesian coordinates. Since $$|x_1 - x_0| = \left(r_i + \frac{1}{N_r}\right)\sin\left(\theta_k + \frac{\pi}{N_\theta}\right)\cos\left(\phi_j + \frac{2\pi}{N_\phi}\right) - r_i\sin\theta_k\cos\phi_j$$

$$= r_i\left(\sin\left(\theta_k + \frac{\pi}{N_\theta}\right)\cos\left(\phi_j + \frac{2\pi}{N_\phi}\right) - \sin\left(\theta_k + \frac{\pi}{N_\theta}\right)\cos\phi_j + \sin\left(\theta_k + \frac{\pi}{N_\theta}\right)\cos\phi_j - r_i\sin\theta_k\cos\phi_j\right) +$$

$$\frac{1}{N_r}\sin\left(\theta_k + \frac{\pi}{N_\theta}\right)\cos\left(\phi_j + \frac{2\pi}{N_\phi}\right)$$

$$= r_i\left(\sin\left(\theta_k + \frac{\pi}{N_\theta}\right)\left(-2\sin\left(\phi_j + \frac{\pi}{N_\phi}\right)\sin\left(\frac{\pi}{N_\phi}\right)\right)\right) +$$

$$2\cos\left(\theta_k + \frac{\pi}{2N_\theta}\right)\sin\left(\frac{\pi}{2N_\theta}\right) + \frac{1}{N_r}\sin\left(\theta_k + \frac{\pi}{N_\theta}\right)\cos\left(\phi_j + \frac{2\pi}{N_\phi}\right)$$

we have $$|x_1 - x_0| \leq r_i\left(\frac{2\pi}{N_\phi} + \frac{\pi}{N_\theta}\right) + \frac{1}{N_r} \leq \frac{2\pi}{N_\phi} + \frac{\pi}{N_\theta} + \frac{1}{N_r}$$

Similarly, $$|y_1 - y_0| \leq \frac{2\pi}{N_\phi} + \frac{\pi}{N_\theta} + \frac{1}{N_r}, |z_1 - z_0| \leq + \frac{\pi}{N_\theta} + \frac{1}{N_r}$$

If $N_r$, N, and $N_\theta$ satisfy $$\frac{1}{N_r} + \frac{2\pi}{N_\phi} + \frac{\pi}{N_\theta} < \frac{2}{\sqrt{3}}\varepsilon$$

then for any x∈S $D_c(x) < \epsilon$.

Geometric Encoding without Accumulating Error The layer decomposition technique described above groups all vertices by layers. Each layer consists of one or more contours which could be either closed or open. So the problem of geometry encoding is now reduced to the problem of encoding the geometry of vertices in a single contour. An efficient method is next described that can encode coordinates without accumulating error, that is, the distortion from productive vector quantization.

Let $P_0, P_1, P_n$ be the vertices which form a contour in that order. Define $\Delta P_i = P_{i+1} - P_i$ for i=0, ..., n−1. Using linear prediction, a straight way to encode all the vertex coordinates would be (1) encode $P_0$ directly; (2) encode $\Delta P_i$, i=0, ..., n−1 by the productive vector quantization method. But there are two disadvantages which are associated with this scheme. On one hand, the error from the productive vector quantization can be accumulated. On the other hand, redundancy still exists in this raw encoding scheme. The accumulating error problem can be solved by taking an on-the-fly computing skill so that any vertex after recovered by the decoder will not deviate its original position by a Euclidean distance more than the maximum distortion of the vector quantization. To overcome the second disadvantage, a novel scheme is suggested next. This scheme is based on statistics of a general case behavior of correction vectors $P_i$ in ordinary contours of the layer decomposition structure.

In order to illustrate the first problem, let $\epsilon_i$ be the distortion of $P_i$ from the productive vector quantization. Let $\Delta\overline{P}_i = \Delta P_i + \epsilon_i$. $\Delta\overline{P}_i$ is the actual code vector. The decoder only knows this code vector $P_i$. It does not know either $\epsilon_i$ nor $\Delta P_i$. Let $\overline{P}_k$ be the corresponding position of $P_k$ that is recovered. Then $$\overline{P}_{i+1 i} = \overline{P}_i + \Delta \overline{P}_i$$

$$= \overline{P}_{i+1} + \Delta \overline{P}_{i l} + \Delta \overline{P}_i$$

$$= \overline{P}_0 + \sum_{k=0}^{i} \Delta \overline{P}_k$$

$$= \overline{P}_0 + \sum_{k=0}^{i} (\Delta P_k + \varepsilon_k)$$

$$= P_{i+1} + \sum_{k=0}^{i} \varepsilon_k$$

Therefore, the accumulating error for $i^{th}$ vertex in a contour is $\Sigma^i_{k=0}\varepsilon_k$. This kind of accumulating error destroys the position fidelity of vertices with large i. To solve this problem, a scheme is taught which that the deviation of any vertex position is controlled within the distortion of the productive vector quantization, with the reasonable assumption that $P_0=\overline{P}_0$ because one can always fully encode the first single vertex with more bits (say, 16 bits) without significantly affecting the final compression ratio. The main idea of the following refined codes is that once a correction vector is quantized, its distortion will be merged into its following correction vector. That is to say, we encode $\Delta P_{i+1}+\varepsilon_{i-1}$ instead of $\Delta P_i$. The whole refined scheme is 1. Encode $P_0$ directly
2. (a) Encode $\Delta P_0$ directly; compute $\varepsilon_0 = \Delta \overline{P}_0 - P_0$ with $\Delta \overline{P}_0$ being the code vector of $P_0$
   (b) For i=1, . . . , n−1, encode $\Delta P_i + \varepsilon_i$; compute $\varepsilon_i = \Delta \overline{P}_1 - (\Delta P_1 + \varepsilon_{i-1})$ with $\Delta \overline{P}_i$ being the code vector of $\Delta P_i$.

Figure 15:
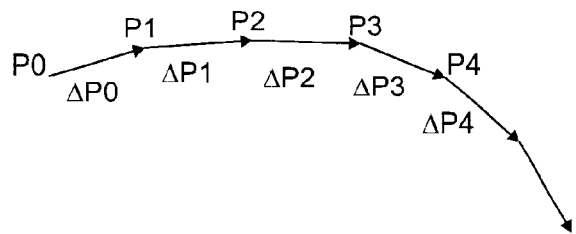
FIG. 15 is a pictorial illustration of correction vector redundancy.

FIG. 15 shows the redundancy contained within adjacent correction vectors. Suppose $\Delta P_k$ and $P_{k+1}$ are two adjacent correction vectors and the two integer triples $(r_i, \phi_j, \theta_k)$ and $(r_{k+1}, \phi_{k+1}, \theta_{k+1})$ are their corresponding codes. Since the angular change in 3D from $\Delta P_k$ to $\Delta P_{k+1}$ is not much in general, it follows that $\phi_{k+1}-\phi_k$ and $\theta_{k+1}-\theta_k$ should usually be small integers. The true correction values $\Delta r$, and could be negative, but there is no need to spend extra bits to indicate the sign of each recorded value. The process simply adds an N if the correction value is negative. The decoder must take care of this convention by making sure that the recovered values r, $\phi$ and $\theta$ be within the range [0, N−1]. Here r, $\phi$, and $\theta$ mean the integer codes, not the true float values. A simple example may help to understand this innovation. Suppose that we want to encode $r_1$ and $r_2$, the integer codes of the lengths of two consecutive correction vectors. Also assume $r_1>r_2$. Thus $r=r_2 r_1<0$. Now we encode r+N, which is in the interval [0, N−1], instead of encoding $\Delta r$ which is negative. After having recovered $r_1$ and the correction value $\Delta r$, the decoder first computer $r_2(=r_1+\Delta r)$. If $r_2$ is in the interval [0, N1], then $r_2$ equals to $r_2$. In our case, $r_2>=N$, which means that $\Delta r$ is the summation of the true difference plus N. So $r_2$ equals to $r_2$ N, because $r_2=r_1+(r2-r_1+N)=r_2+N$. This approach can be similarly applied to the other two components $\phi$ and $\theta$.

Figure 28:
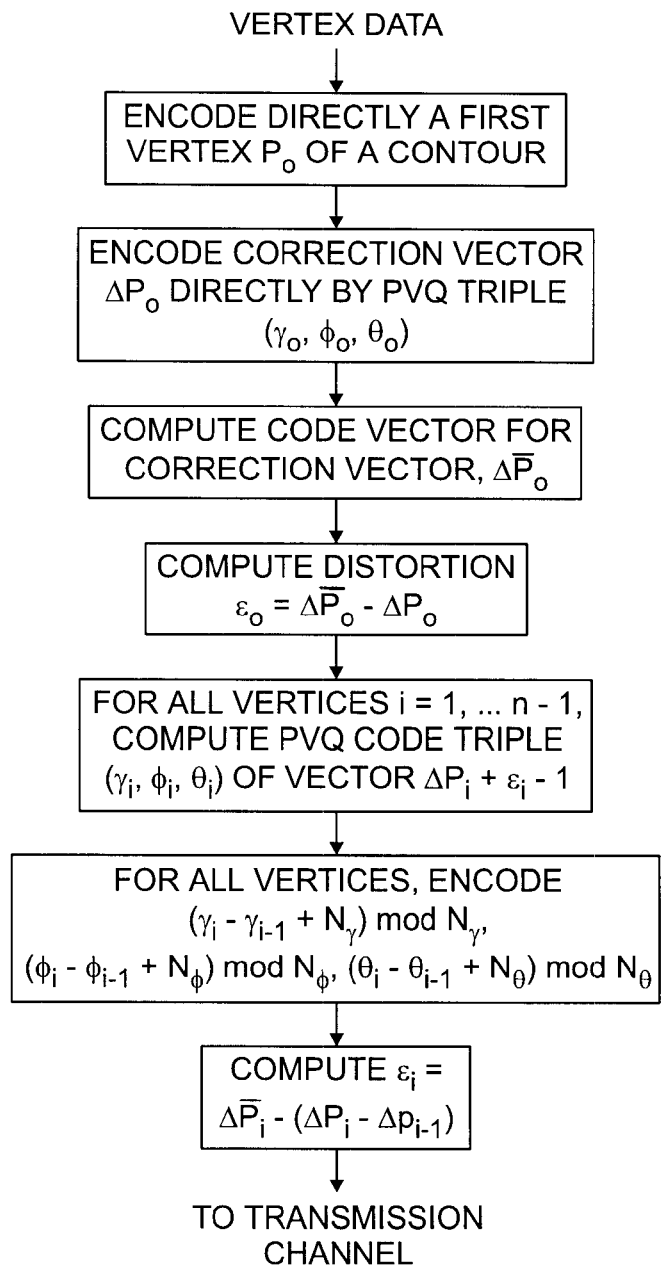

Finally, as seen in FIG. 28, we have the following encoding scheme for a single contour.

1. Encode $P_0$ directly
2. (a) Encode $\Delta P_0$ directly by its PVQ code triple $(r_0, \phi_0, \theta_0)$;
   Compute $\varepsilon_0 = \Delta \overline{P}_0 - P_0$ with $\Delta \overline{P}_0$ being the code vector of $\Delta P_0$
   (b) For i=1, . . . , n1,
   Compute the PVQ code triple $(r_i, \phi_i, \theta_i)$ of the vector $\Delta P_i + \varepsilon_{i-1}$ Encode $(r_i \ r_{i1}+N_r)$ mod $N_r$, $(\phi_i-\phi_{i-1}+N_\theta)$ mod $N_\phi$, $(\theta_i-\theta_i-1+N_\phi)$ mod N;
Compute $\varepsilon_i=\Delta\overline{P}_i-(\Delta P_i+\varepsilon_{i-1})$ with $\Delta \overline{P}_i$ being the code vector of $\Delta P_i$.

Note that $\Delta \overline{P}_i$ can be obtained from the three codebooks.

In implementation, a modified version of the classic Huffman coding was designed. The three components $\Delta r$, $\Delta \phi$ and $\Delta \theta$ are encoded separately with three different Huffman tables. Let S be the symbol set of all integers in [0, N−1]. Again N varies, dependent on the component being encoded. Notice here that every symbol is an integer. If the whole encoding process is off-line, then the exact occurrence of each symbol can be computed. Therefore, the classic Huffman codes could be utilized. However, classic Huffman codes has two disadvantages. First, the statistics procedure is time-consuming for very large input models and thus is not suitable for many applications. The second disadvantage is that the encoder needs to transfer a large Huffman table, which adversely affects the final compression ratio. Our process is based on a static Huffman table which is created by measuring symbol occurrence from many large models. This algorithm is very efficient because there is no need to send the Huffman table.

Figure 16:
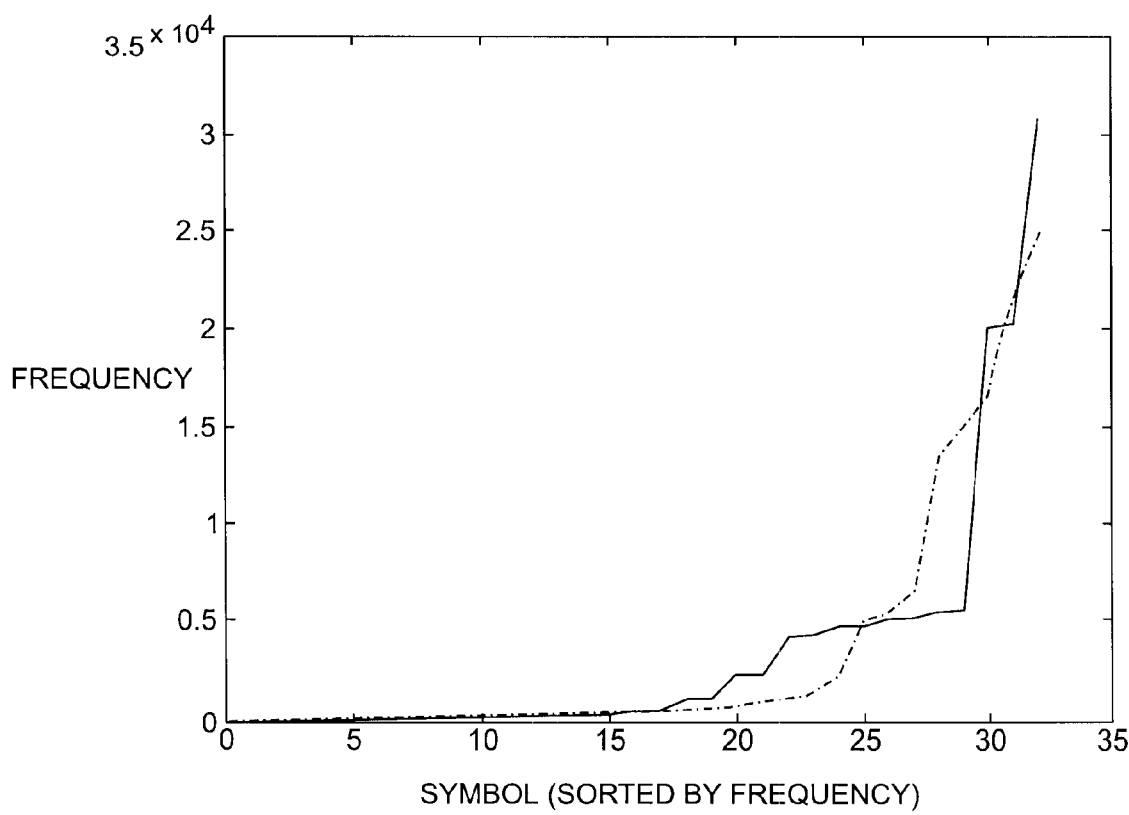
FIGS. 16, 17 and 18 are plots of the frequency of occurrence of symbols for three different sizes of models.
Figure 17:
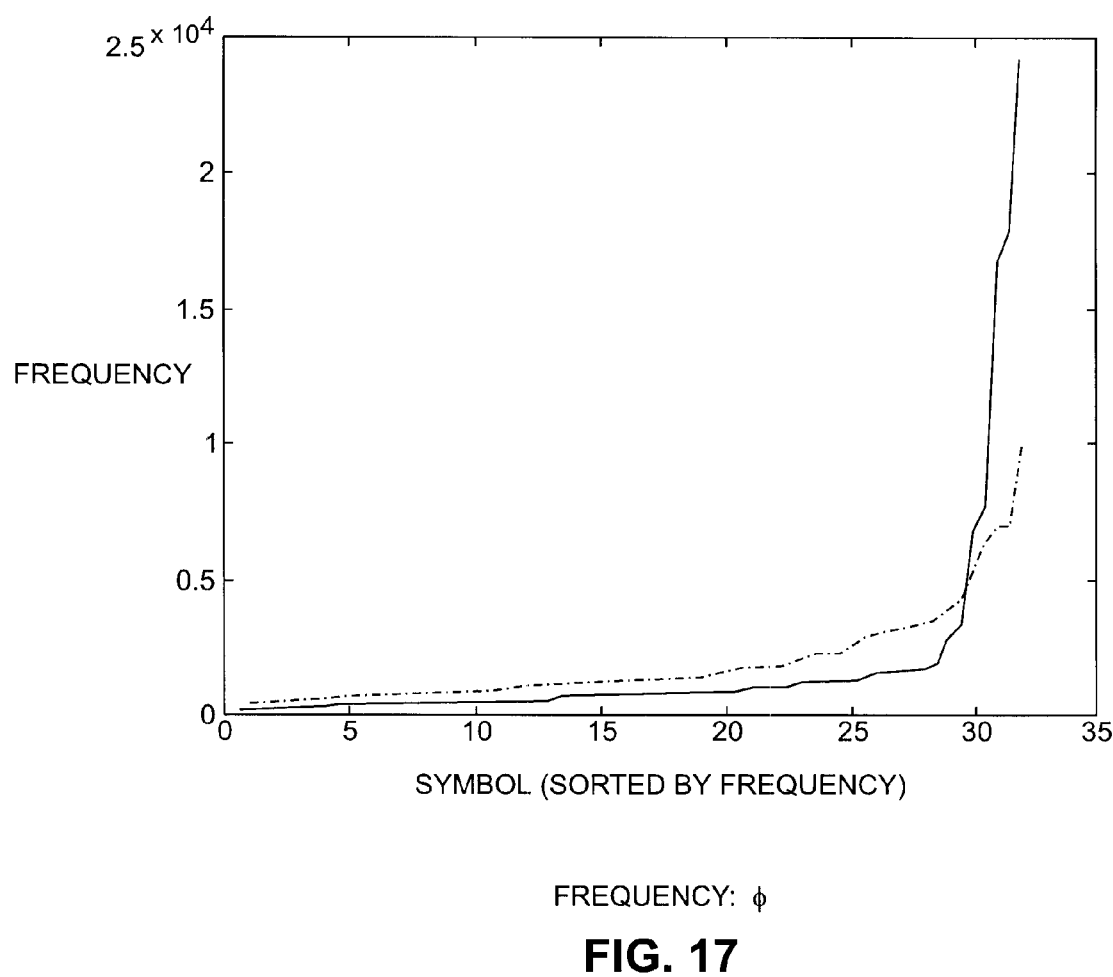
Figure 18:
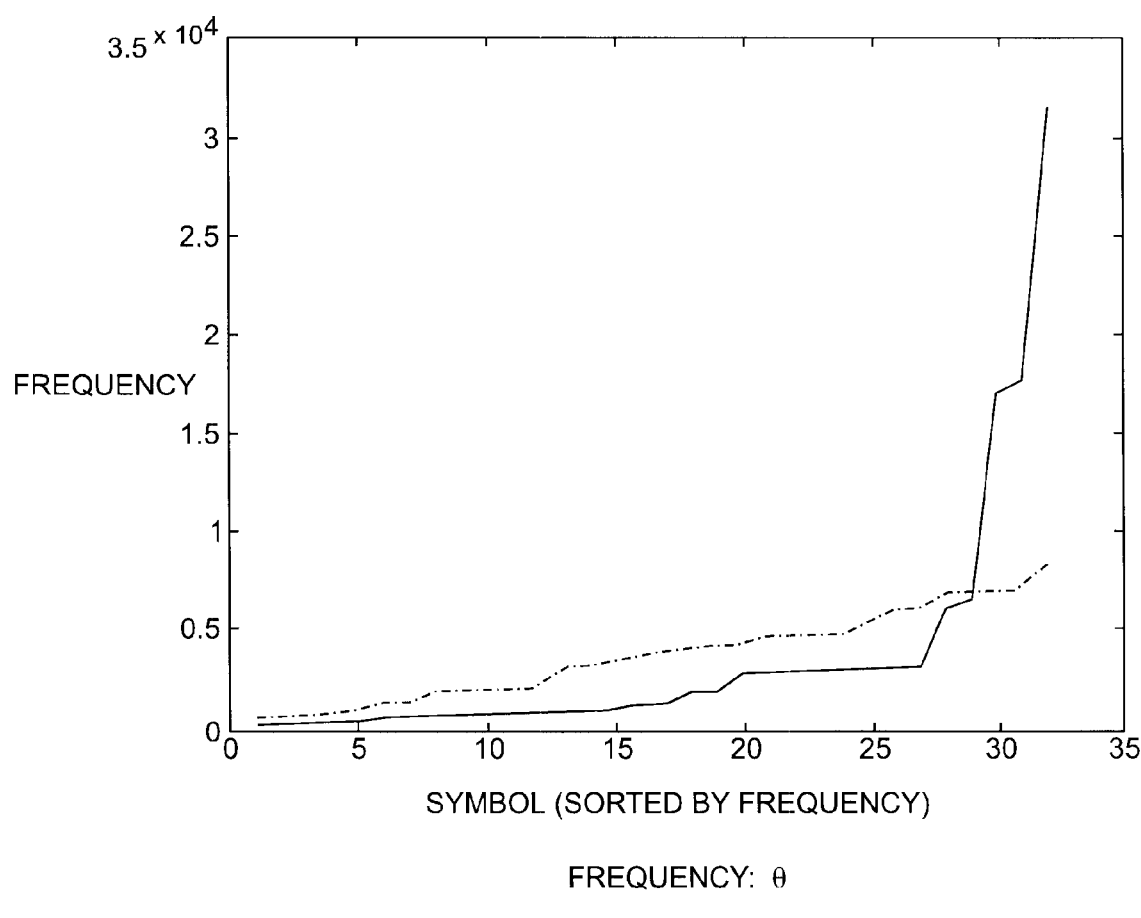

Results show that code difference encoding is more efficient than direct encoding of the PVQ codes of the prediction vectors. If each integer code is considered as a symbol, FIGS. 16, 17 and 18 show the frequencies of symbols for three different sizes of models. Each solid curve stands for the frequency of code differences, while the dash line is for codes from direct encoding scheme.

From these frequency curves, it is evident that in the code difference approach according to the present invention, most codes are accumulated around only a few symbols, mostly at the two-boundary area of the code spaces, which are [0, 31], [0, 63] and [0, 32] in our example. This observation is also supported by FIG. 15.

In summary, the productive vector quantizer encodes vertex coordinates with the following advantages. First, the codebook is small and thus does not occupy much memory. In addition, only the size of the codebook is needed at the decoding side and the entire codebook does not need to be transmitted. Secondly, the constant time nearest neighbor searching makes the encoder (and also the decoder) perform extremely fast. This feature cannot be reached by an arbitrary length vector quantization. Finally, this vector quantization method can attain any specified error tolerance by adjusting the sizes of the sub-codebooks. Our encoding scheme guarantees no accumulating errors by the skill of merging current distortion in coming correction vector.

What is claimed is:

1. A system for generating a video bitstream representing a 3-D object, comprising:

a database medium containing a dataset representing a layered decomposition from a triangle mesh of said 3-D object into multiple vertex layers and multiple triangle layers;

means for determining from said dataset general strips of said triangles in which one vertex of each constituent triangle lies in a first vertex layer and the other two vertices of each constituent triangle lie in a vertex layer adjacent to said first vertex layer;

means for determining from said dataset special triangles associated with any said triangle strip the vertices of which fall in the same vertex layer;

means for encoding the triangles of each said general triangle strip, using values of two starting vertices of parent contour and child contour and of two common vertices of adjacent said triangles plus a bit march indicia;

means for encoding said special triangles with a relative index defining the position of each said special triangle within said strip; and means for combining the encodings in an output to a transmission channel.

2. The system of claim 1, wherein said combining means further comprising means for alternately combining said encodings of said general triangles and said special triangles into an output to said transmission channel.

3. The system of claim 2, further comprising means for encoding and transmitting data on the geometry of each said triangle in said triangle strips, said means comprising:

means for identifying said triangle vertices which fall in a single contour of said multiple layers;

means for encoding with vector coordinates vectors representing the geometry of said triangle vertices in each said single contour; means for generating correction vectors respectively representing vector differences between adjacent ones of said general triangles and adjacent ones of said special triangles;

means for measuring the distortion of each said correction vector; and means for merging said distortion of each adjacent said correction vector into its following correction vector and transmitting the merged data to said transmission channel.

4. The system of claim 3, further comprising:

means for eliminating essentially half of said vertices within each said vertex layer prior to said encoding and said transmitting.

5. The system of claim 4, further comprising:

means for eliminating essentially half of the vertex layers in said triangle mesh prior to said encoding and said transmitting.

6. The system of claim 1, wherein said 3-D object is substantially bilaterally symmetric thus to comprise a left-half and a right-half, and said system further comprises:

means for encoding vertices of triangles in said general and special triangle strips separately within said left-half and said right half of said object;

means for generating a number representing displacement differences between the geometric positions of corresponding ones of said vertices of said left and right-halves of said object;

means for transmitting each said encoded triangle vertex of either said half; and means for transmitting said difference number associated with each said transmitted encoded triangle vertex.

7. The system of claim 6, further comprising means for setting a threshold defining which ones of said difference numbers to transmit.

8. The system of claim 7, wherein said displacement differences are a function of time.

9. A process for preparing and transmitting through a network data representing 2-D images of a 3-D object, said process comprising the steps of:

capturing a polygon mesh of 3-D video images;

decomposing said mesh into layered 2-D data;

constructing from said layered data vertex contours of said polygon;

constructing from said layered data surface contours of said polygon;

constructing from said polygon surface contours elongate strips of polygons having parent and child contours;

identifying within said elongate strips both generalized polygon strips and exceptional polygon strips containing bubbles;

encoding said generalized polygon strips using values of two starting vertices of each parent contour and child contour and values of two common vertices of adjacent said triangles and a bit march indicia;

concurrently encoding said exceptional polygon strips having bubbles using a relative index defining the position of each exceptional polygon within said polygon strip;

alternately combining said encodings of said generalized and said exceptional polygon strips into a signal; and applying said signal to a transmission medium.

10. The process of claim 9, wherein said polygon mesh is a triangle mesh.

11. The process of claim 10, comprising the further step of encoding and transmitting data on the geometry of each said triangle in said triangle strips, by:

identifying said triangle vertices which fall in a single contour of said multiple layers;

encoding with vector coordinates vectors representing the geometry of said triangle vertices in each said single contour;

generating correction vectors respectively representing vector differences between adjacent ones of said general triangles and adjacent ones of said special triangles;

measuring the distortion of each said correction vector; and merging said distortion of each adjacent said correction vector into its following correction vector and transmitting the merged data to said transmission channel.

12. The process of claim 11, comprising the further step of eliminating essentially half of said vertices within each said vertex layer prior to said encoding and said transmitting.

13. The process of claim 12, comprising the further step of eliminating essentially half of the vertex layers in said triangle mesh prior to said encoding and said transmitting.

14. The process of claim 13, wherein said 3-D object is substantially bilaterally symmetric thus to comprise a left-half and a right-half, and said process comprises the further steps of:

encoding vertices of triangles in said general and special triangle strips separately within said left-half and said right half of said object;

generating a number representing displacement differences between the geometric positions of corresponding ones of said vertices of said left- and right-halves of said object;

transmitting each said encoded triangle vertex of either said half; and transmitting said difference number associated with each said transmitted encoded triangle vertex.

15. The process of claim 14, comprising the further step of setting a threshold defining which ones of said difference numbers to transmit.

16. The process of claim 15, wherein said displacement differences are a function of time.

* * * * *